United States Patent [19]

Sugawa et al.

[11] Patent Number: 5,198,858
[45] Date of Patent: Mar. 30, 1993

[54] IMAGE FORMING APPARATUS CAPABLE OF MINIMIZING TIME REQUIRED FOR TRANSCRIPTION

[75] Inventors: Hiroya Sugawa; Kiyoshi Emori, both of Toyokawa; Koji Shakushi, Toyohashi; Takayuki Ariyama, Machida; Masamichi Kishi, Okazaki, all of Japan

[73] Assignee: Minolta Camera Kabushiki Kaisha, Osaka, Japan

[21] Appl. No.: 881,884

[22] Filed: May 12, 1992

[30] Foreign Application Priority Data

May 13, 1991 [JP] Japan .................. 3-107370

[51] Int. Cl.⁵ .................. G03G 15/00; G03G 15/22
[52] U.S. Cl. .................. 355/202; 355/313
[58] Field of Search .......... 355/202, 210, 272, 308, 355/313, 311

[56] References Cited

U.S. PATENT DOCUMENTS 4,200,390  4/1980  Tagashira et al. .......... 355/202
4,967,240 10/1990  Kitano et al. ............. 355/319 X

FOREIGN PATENT DOCUMENTS 62-2616  1/1987  Japan .

Primary Examiner—Joan H. Pendegrass
Attorney, Agent, or Firm—Willian Brinks Olds Hofer Gilson & Lione

[57] ABSTRACT

An image forming apparatus is provided with a host computer, a copier, and a printer operable in response to instructions from the host computer. Upon receipt of image information from the host computer, the printer forms an image on a first sheet whereas the copier forms on a second sheet an image of a document placed on a document platform. The apparatus is further provided with a document conveying device for conveying to the document platform the first sheet as a document on which the image has been formed by the printer. The apparatus has at least two drive modes: a single drive mode at which all the transcripts are prepared by sole use of the printer and a double drive mode at which the first sheet having the image formed by the printer is conveyed by the document conveying device so that the rest of transcripts are prepared by the copier.

9 Claims, 20 Drawing Sheets

IMAGE FORMING APPARATUS CAPABLE OF MINIMIZING TIME REQUIRED FOR TRANSCRIPTION

BACKGROUND OF THE INVENTION

1. Field of the Invention

The present invention relates generally to an image forming apparatus capable of performing both copying and printing operations, and more particularly to a composite apparatus provided with a host computer, a copier, and a printer operable in response to instructions from the host computer.

2. Description of the Prior Art

Because laser printers are extremely superior in definition of images, they are in wide practical use today as an output device for word processors or image editing apparatus capable of preparing and editing diagrams, figures, patterns or the like on a CRT display. However, the laser printers used for this purpose are generally small-sized low-speed machines having a printing speed of about 5-6 sheets/min. One reason for this is that manuscripts prepared by word processors or the like are generally not so long and it is quite rare that manuscripts having several hundred pages or more are prepared by the word processors. Accordingly, the time required for printing is relatively short. Another reason is that high-speed laser printers are much more expensive than word processors or the like. When a number of transcripts are required from a manuscript prepared by a word processor or the like, the manuscript is initially printed by the use of any suitable printer, and thereafter, a required number of copies are generally prepared by the use of a high-speed copier, thereby causing an operator trouble.

To solve this problem, a composite apparatus having composite processing functions has been proposed, which is provided with a printer and a copier and in which a document prepared by the printer is conveyed to a document platform of the copier and is copied by the copier.

However, when a plurality of transcripts are required, composite processing cannot always minimize the time required for transcription. In other words, when the required number of transcripts is small, the sole use of the printer can occasionally make such time shorter than the composite processing.

The terms "transcript" and "transcription" are used to denote any of copies and prints and any of copying and printing operations, respectively, unless specified.

SUMMARY OF THE INVENTION

The present invention has been developed to overcome the above-described disadvantages.

It is accordingly an object of the present invention to provide an image forming apparatus capable of minimizing the time required for transcription.

In accomplishing this and other objects, an image forming apparatus according to the present invention comprises a first image forming means for forming an image on a first sheet upon receipt of image information, a second image forming means having a document platform for forming on a second sheet an image of a document placed on the document platform, and a document conveying means for conveying to the document platform the first sheet as a document on which the image has been formed by the first image forming means. The image forming apparatus further comprises a setting means for setting the number of transcripts to be prepared and a transcription mode selector means for selecting either a single drive transcription mode or a double drive transcription mode to minimize the time required for preparing a required number of transcripts set by the setting means. At the single drive transcription mode, all the transcripts are prepared by sole use of the first image forming means. At the double drive transcription mode, the first sheet having the image formed by the first image forming means is conveyed by the document conveying means so that the rest of transcripts are prepared by the second image forming means.

Alternatively, the transcription mode selector means may be replaced by a determination means for determining whether the number of transcripts is greater than a given number and a control means for controlling the first image forming means, the document conveying means, and the second image forming means. In this case, when the determination means determines that the number of transcripts is greater than the given number, the control means controls the first image forming means so as to prepare one transcript and further controls the document conveying means so as to convey the one transcript to the second image forming means. Thereafter, the control means controls the second image forming means so as to prepare the rest of transcripts.

BRIEF DESCRIPTION OF THE DRAWINGS

This and other objects and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

Figure 1:
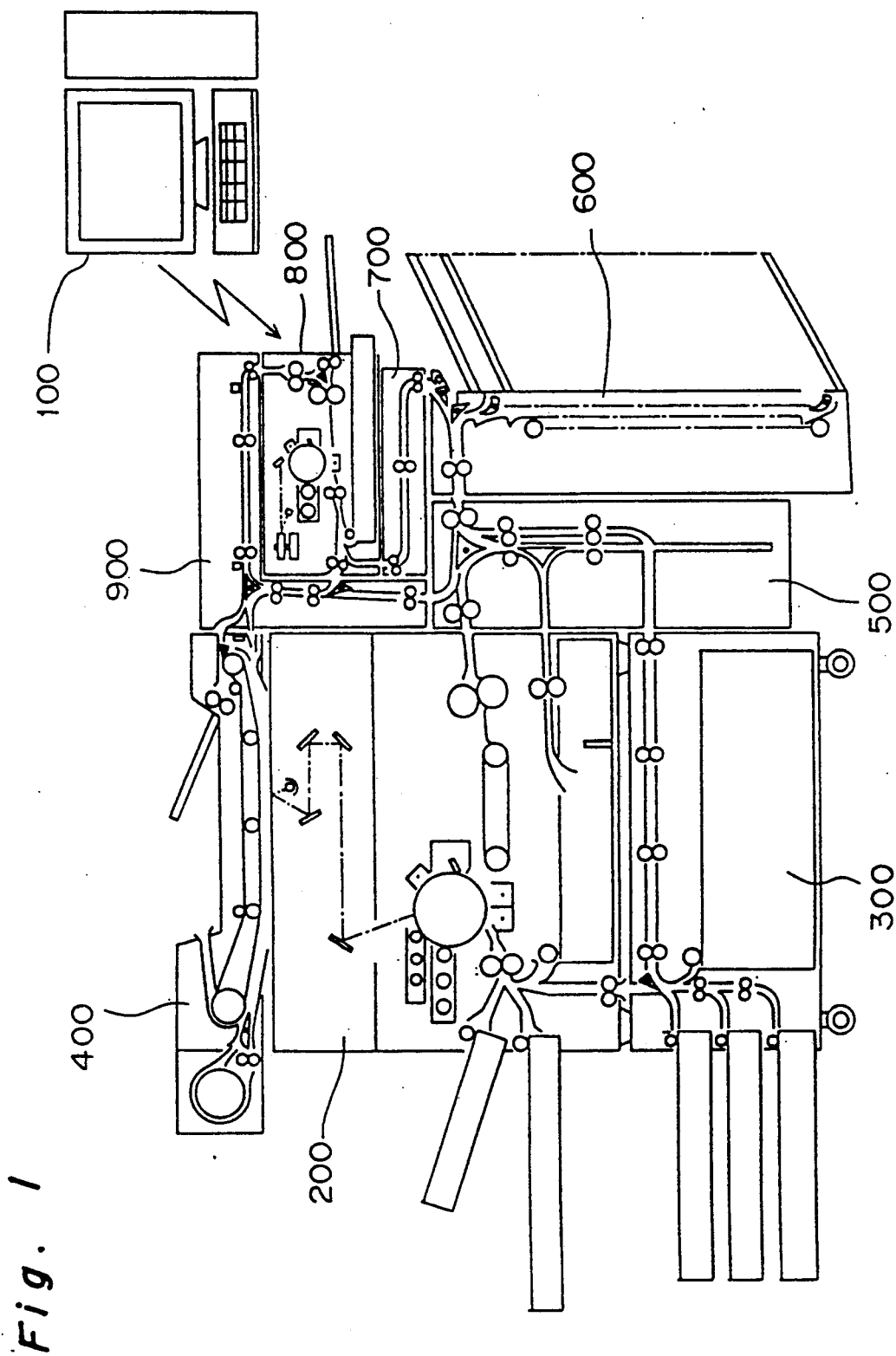
FIG. 1 is a schematic sectional view of a composite apparatus according to the present invention.

Referring now to the drawings, an image forming apparatus or a composite apparatus according to the present invention will be explained hereinafter.

I. Organization of Composite Apparatus (FIGS. 1 to 6)

As shown in FIG. 1, the composite apparatus according to the present invention comprises a host computer 100, a copier 200, a sheet feeder 300, an automatic document feeder (ADF) 400, a sheet reversing device 500, a sorter 600, a sheet conveying device 700, a laser printer 800, and a document conveying device 900.

(I-a) Host Computer 100 (FIG. 1)

A personal computer, a word processor, or an image editing device for editing diagrams, figures, patterns or the like on a CRT display is preferably employed as the host computer 100.

Figure 2:
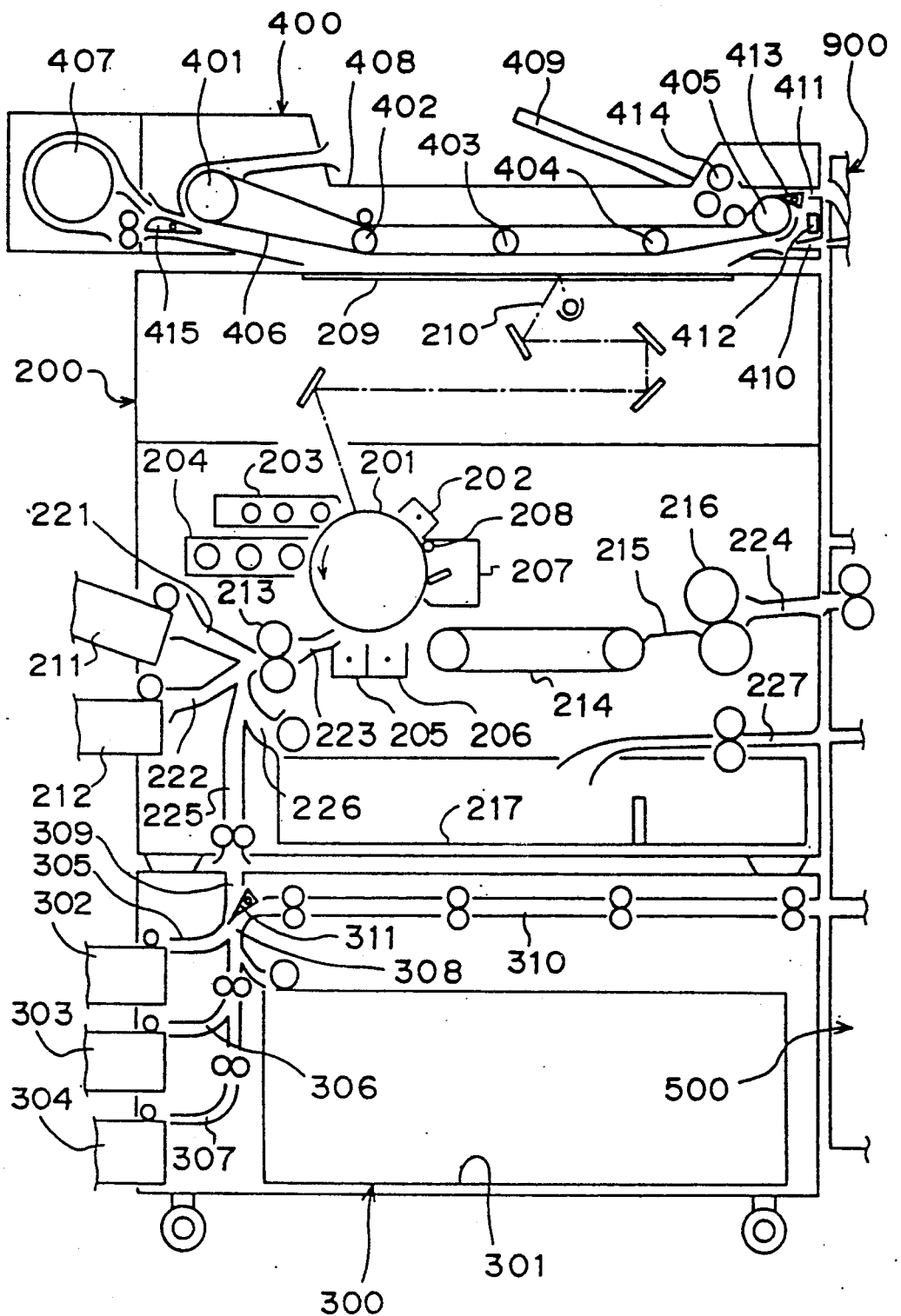
FIG. 2 is a schematic sectional view of a copier, a sheet feeder, and an automatic document feeder.

(I-b) Copier 200 (FIG. 2)

FIG. 2 schematically depicts the copier 200, in which a corona charger 202, a color developing device 203, a black developing device 204, a transfer charger 205, a separation charger 206, a cleaning device 207, and an eraser 208 are disposed in this order around a photosensitive drum 201. A scanning optical system 210 is disposed below a document platform 209 made of glass.

As viewed in FIG. 2, two sheet cassettes 211 and 212 and a pair of timing rollers 213 are disposed on the left-hand side of the transfer charger 205. A conveyor belt 214, a guide plate 215, and a fixing device 216 are disposed on the right-hand side of the separation charger 206, and an intermediate tray 217 is disposed below the conveyor belt 214.

The copier 200 is provided with a plurality of sheet paths 221-227. Sheet paths are hereinafter referred to simply as paths. The paths 221 and 222 lead sheet medium such as, for example, copying papers supplied from the sheet cassettes 211 and 212 to the timing rollers 213, respectively. The path 223 leads the papers from the timing rollers 213 to a location opposed to the transfer charger 205. The path 224 introduces the papers having passed the fixing device 216 to the sheet reversing device 500. The path 225 introduces papers supplied from the sheet feeder 300 to the timing rollers 213. The path 226 guides papers supplied from the intermediate tray 217 to the timing rollers 213. The path 227 guides to the intermediate tray 217 papers returned back to the copier 200 from the sheet reversing device 500.

(I-c) Sheet Feeder 300 (FIG. 2)

The sheet feeder 300 is disposed below the copier 200 to carry it. The sheet feeder 300 accommodates a sheet feeder unit 301 and is provided with three sheet cassettes 302-304. The sheet feeder 300 is also provided with paths 305-307 for directing papers supplied from the sheet cassettes 302-304 upwards, a path 309 extending upwards from a junction of the paths 305-307 and leading to the path 225 of the copier 200, and a path 310 extending generally horizontally from the junction 308 and leading to the sheet reversing device 500. A switching claw piece 311 is pivotally mounted at the junction 308.

Figure 3:
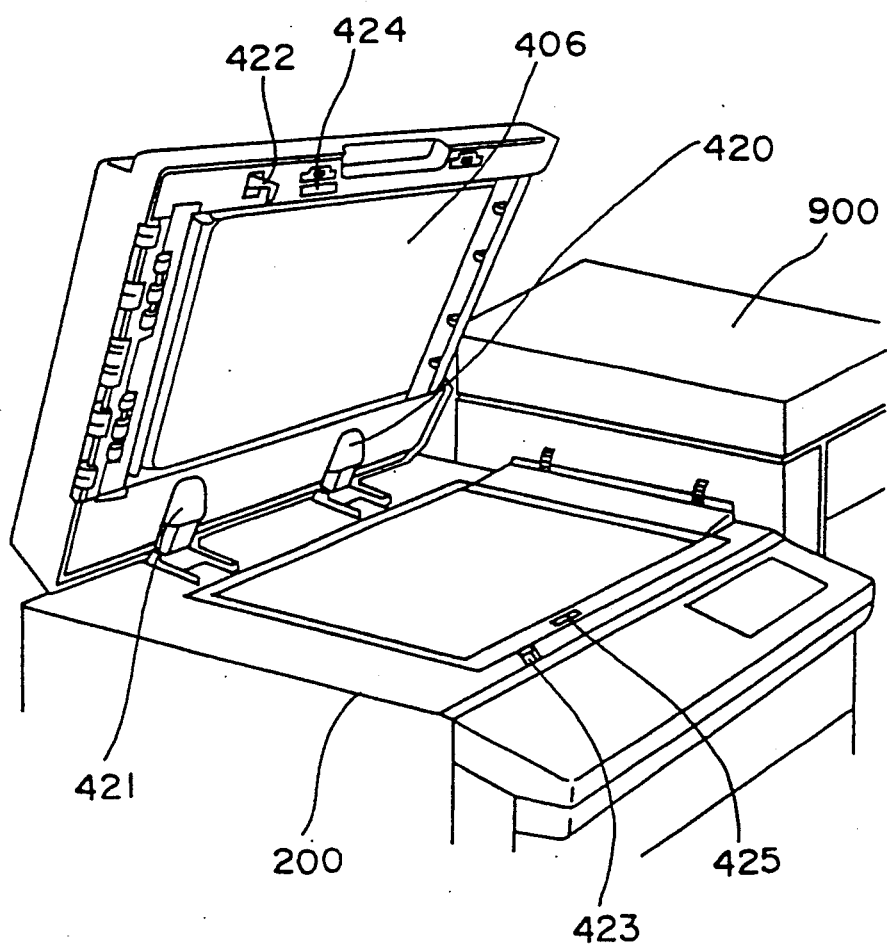
FIG. 3 is a perspective view of the automatic document feeder and an upper portion of the copier with the automatic document feeder opened.

(I-d) Automatic Document Feeder (ADF) 400 (FIGS. 2 and 3)

As shown in FIGS. 2 and 3, the automatic document feeder 400 is pivotally mounted on an upper portion of the copier 200 via hinges 420 and 421 and can pivot between a closed position and an opened position. When the automatic document feeder 400 is in the closed position, a hook 422 mounted on the side opposite to the hinges 420 and 421 engages a hook receiving portion 423 of the copier 200 and is locked. The locked condition is detected by two sensors 424 and 425 mounted on the automatic document feeder 400 and the copier 200, respectively.

The automatic document feeder 400 is provided with a conveyor belt 406 passed around a plurality of rollers 401-405, a document reversing unit 407 for reversing documents, a document discharge tray 408, and a document feed cassette 409. The conveyor belt 406 can rotate both in the forward and reverse directions. The automatic document feeder 400 is further provided with a path 410 for introducing documents conveyed from the document conveying device 900 to the underneath of the conveyor belt 406, a path 411 for introducing documents placed on the document feed cassette 409 to the document conveying device 900, and a document detector sensor 412 disposed beside the path 410 to detect papers conveyed from the document conveying device 900 to the automatic document feeder 400 via the path 410. The automatic document feeder 400 is also provided with a switching claw piece 413 positioned between the path 411 and the conveyor belt 406 and a switching claw piece 415 positioned below the roller 401 and in the proximity of the document reversing unit 407. Documents fed from the document feed cassette 409 are directed to either the path 411 or the document platform 209 by the switching claw piece 413 whereas those conveyed from the document platform 209 are directed to either the document reversing unit 407 or the document discharge tray 408 by the switching claw piece 415.

Figure 4:
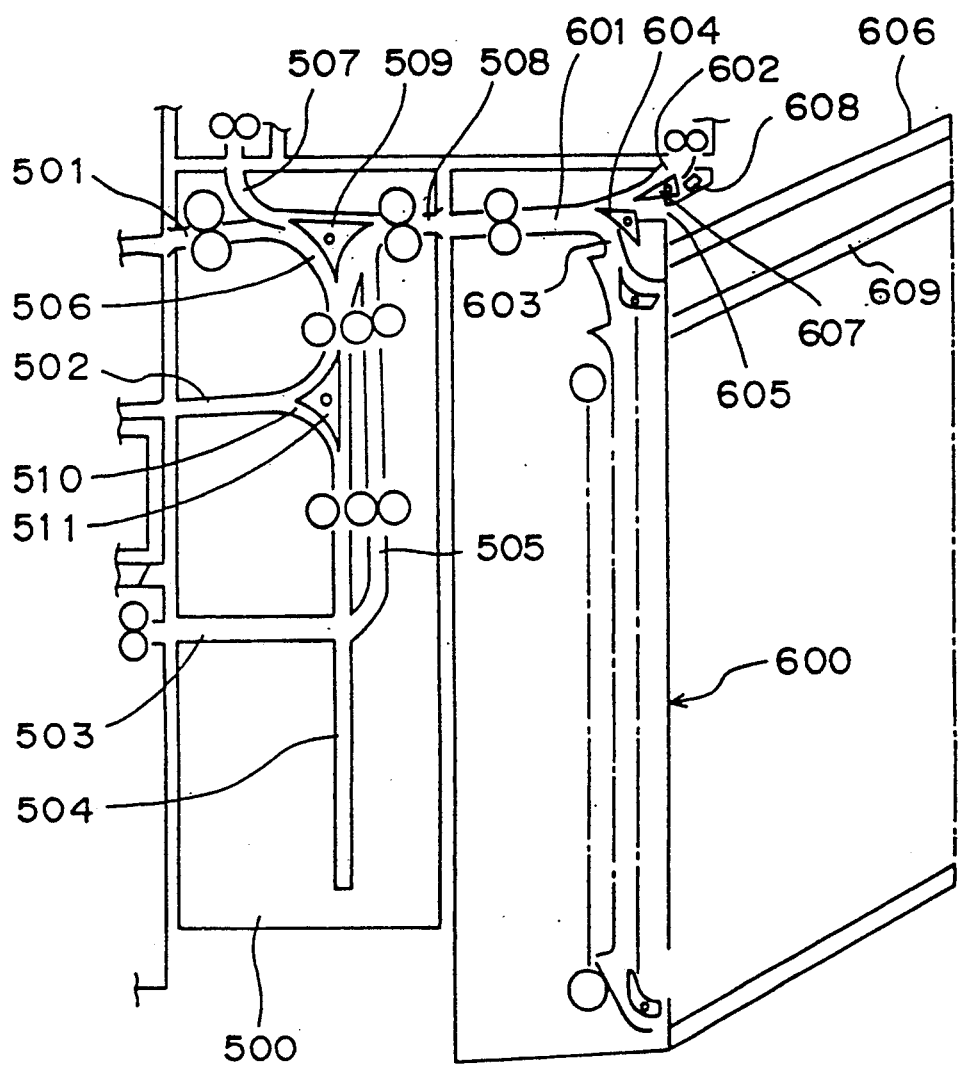
FIG. 4 is a schematic sectional view of a sheet reversing device and a sorter.

(I-e) Sheet Reversing Device 500 (FIG. 4)

As viewed in FIG. 1, the sheet reversing device 500 is disposed on the right-hand side of the copier 200 and the sheet feeder 300. The sheet reversing device 500 is provided with a path 501 leading to the fixing device 216 of the copier 200, a path 502 leading to the intermediate tray 217, and a path 503 leading to the horizontal path 310 of the sheet feeder 300. The paths 501 and 502 lead to a vertically extending sheet reversing path 504 whereas the lowermost path 503 crosses the sheet reversing path 504 and leads to a vertically extending path 505 of which an upper portion leads to the sheet reversing path 504. The sheet reversing device 500 is further provided with a path 507 extending obliquely upwardly and leading to the document conveying device 900 and a path 508 leading to the sorter 600. These paths 507 and 508 also lead to a junction 506 of the sheet reversing path 504, the vertically extending path 505, and the uppermost path 501. A switching claw piece 509 is pivotally mounted at the junction 506 to introduce papers conveyed via the uppermost path 501 or those conveyed from the document conveying device 900 via the path 507 to either the sheet reversing path 504 or the path 508. Another switching claw piece 511 is pivotally mounted at a junction 510 of the sheet reversing path 504 and the middle path 502 to introduce papers conveyed to the sheet reversing path 504 from above to either a lower portion of the sheet reversing path 504 or the path 502 leading to the intermediate tray 217.

(I-f) Sorter 600 (FIG. 4)

The sorter 600 is provided with a path 601 leading to the path 508 of the sheet reversing device 500. This path 601 is branched into two paths 602 and 603. From the path 602 is further branched a path 605, which leads to the uppermost bin 606. A switching claw piece 604 is pivotally mounted at a junction of the paths 602 and 603 whereas another switching claw piece 607 is pivotally mounted at a junction of the paths 602 and 605. Beside the path 602 is disposed a sheet detector sensor 608.

Figure 5:
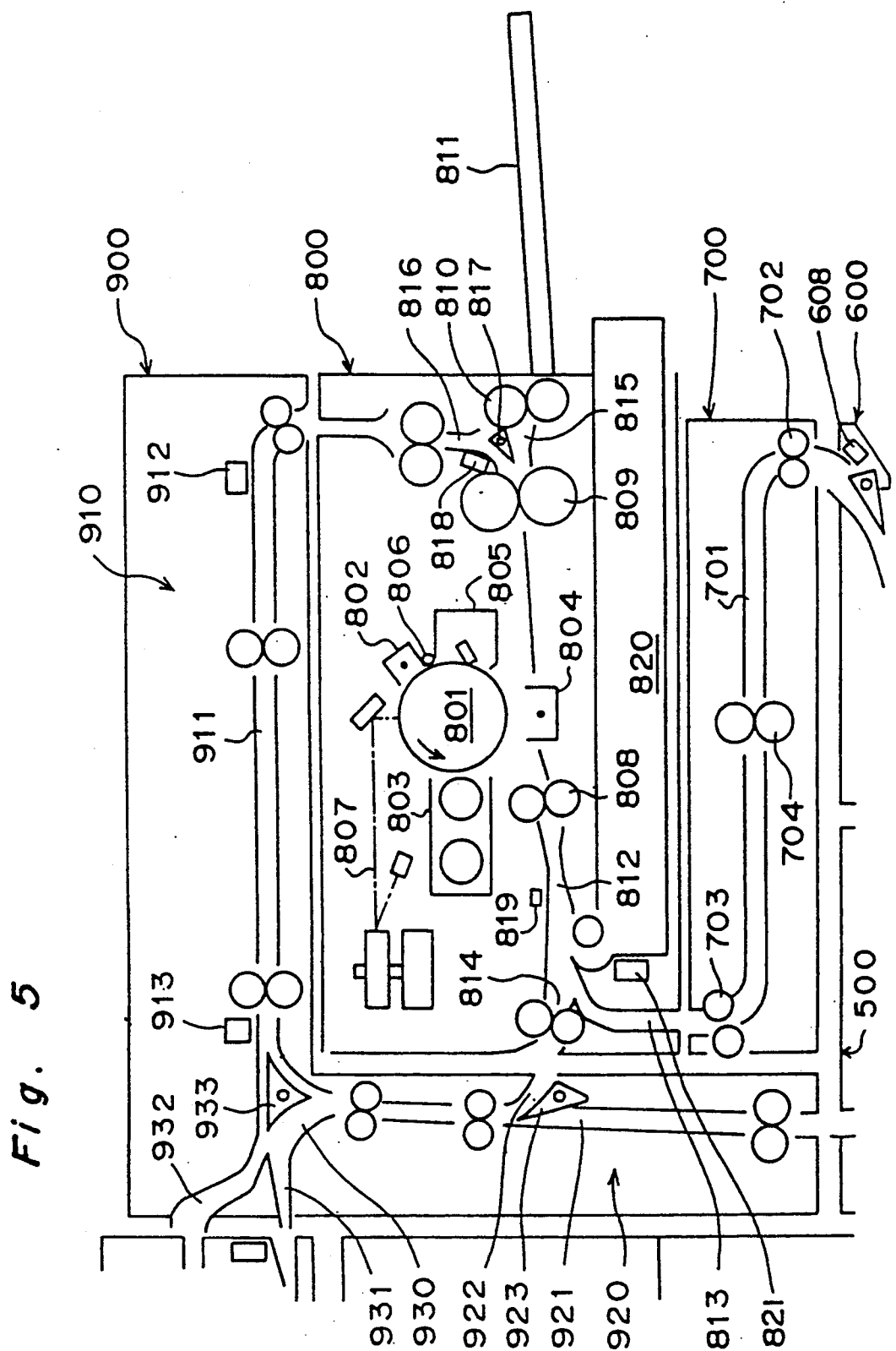
FIG. 5 is a schematic sectional view of a sheet conveying device, a laser printer, and a document conveying device.

(I-g) Sheet Conveying Device 700 (FIG. 5)

The sheet conveying device 700 is provided with a path 701 for conveying papers from the sorter 600 to the laser printer 800. The sheet conveying device 700 is further provided with three pairs of rollers 702-704 in association with the path 701. The rollers 702 are disposed on the side of the sorter 600, the rollers 703 on the side of the laser printer 800, and the rollers 704 between these rollers 702 and 703.

(I-h) Laser Printer (LBP) 800 (FIG. 5)

The laser printer 800 is a small-sized low speed printer, which is widely used as a printing device for a word processor or the like. The laser printer 800 is provided with a photosensitive drum 801, a corona charger 802, a developing device 803, a transfer charger 804, a cleaning device 805, and an eraser 806. The corona charger 802, the developing device 803, the transfer charger 804, the cleaning device 805, and the eraser 806 are disposed in this order around the photosensitive drum 801. The laser printer 800 is further provided at its upper portion with a laser optical system 807 and at its bottom portion with a sheet feed unit 820. As viewed in FIG. 5, a pair of timing rollers 808 are disposed on the left-hand side of the transfer charger 804 whereas a fixing device 809, a pair of discharge rollers 810, and a discharge tray 811 are disposed on the right-hand side of the transfer charger 804. The laser printer 800 is also provided with a path 812 for conveying papers accommodated in the sheet feed unit 820 to the timing rollers 808, a path 813 leading to the path 701 of the sheet conveying device 700, and a path 814 leading to the document conveying device 900. Both the paths 813 and 814 also lead to the path 812. A path 815 extends generally horizontally between the fixing device 809 and the discharge rollers 810, and a path 816 extends upwards therefrom. Papers having passed the fixing device 809 are directed to either the path 815 or 816 by a switching claw piece 817 pivotally mounted at a junction of the paths 815 and 816.

(I-i) Document Conveying Device 900 (FIG. 5)

The document conveying device 900 comprises a horizontally arranged conveying unit 910 and a vertically arranged conveying unit 920. The horizontal conveying unit 910 is provided with a horizontally extending path 911 leading to the path 816 of the laser printer 800 whereas the vertical conveying unit 920 is provided with a vertically extending path 921 leading to the path 507 of the sheet reversing device 500. A path 922 leading to the path 814 of the laser printer 800 is branched from an intermediate portion of the vertical path 921, and a switching claw piece 923 is pivotally mounted at a junction of the paths 921 and 922 to introduce papers conveyed from above via the path 921 to either a lower portion of the path 921 or the path 922. The horizontal path 911 and the vertical path 921 join at a location 930 where both the units 910 and 920 are coupled with each other. From this location 930 are branched two paths 931 and 932, which lead to the paths 410 and 411 of the automatic document feeder 400, respectively. A switching claw piece 933 is pivotally mounted at the location 930 to selectively introduce papers conveyed leftwards via the horizontal path 911 to either the paths 931 and 932 leading to the automatic document feeder 400 or the vertical path 921.

Figure 6:
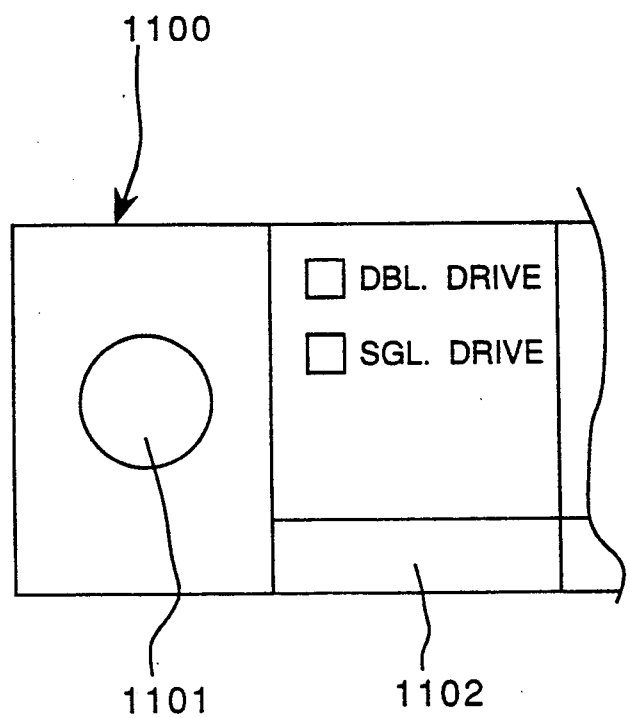
FIG. 6 is a partial top plan view of an operation panel of the copier.
Figure 7:
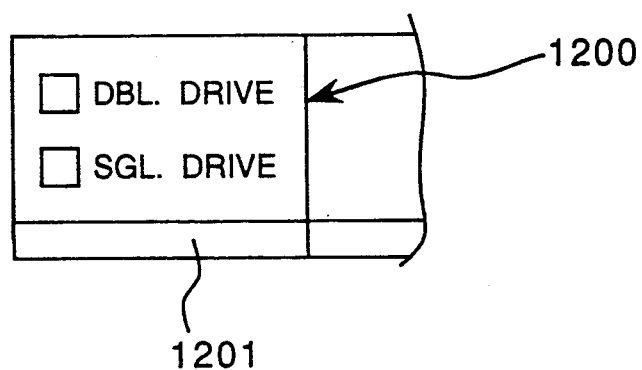
FIG. 7 is a partial top plan view of an operation panel of the laser printer.

(I-j) Operation Panels 1100, 1200 (FIGS. 6 and 7)

The copier 200 and the laser printer 800 are provided with respective operation panels 1100 and 1200 as shown in FIGS. 6 and 7, respectively.

The operation panel 1100 is provided with a copy start switch 1101 and a mode selector switch 1102. The mode selector switch 1102 is a switch for performing switching between a double drive mode and a single drive mode, both of which are discussed later. Because image data from the copier 200 cannot be inputted into the laser printer 800, this switch 1102 is practically effective in canceling the double drive mode when the double drive mode is set.

The operation panel 1200 is provided with a mode selector switch 1201 for performing switching between the double drive mode and the single drive mode, as is the case with the mode selector switch 1102 of the operation panel 1100.

II. System Organization

Figure 8:
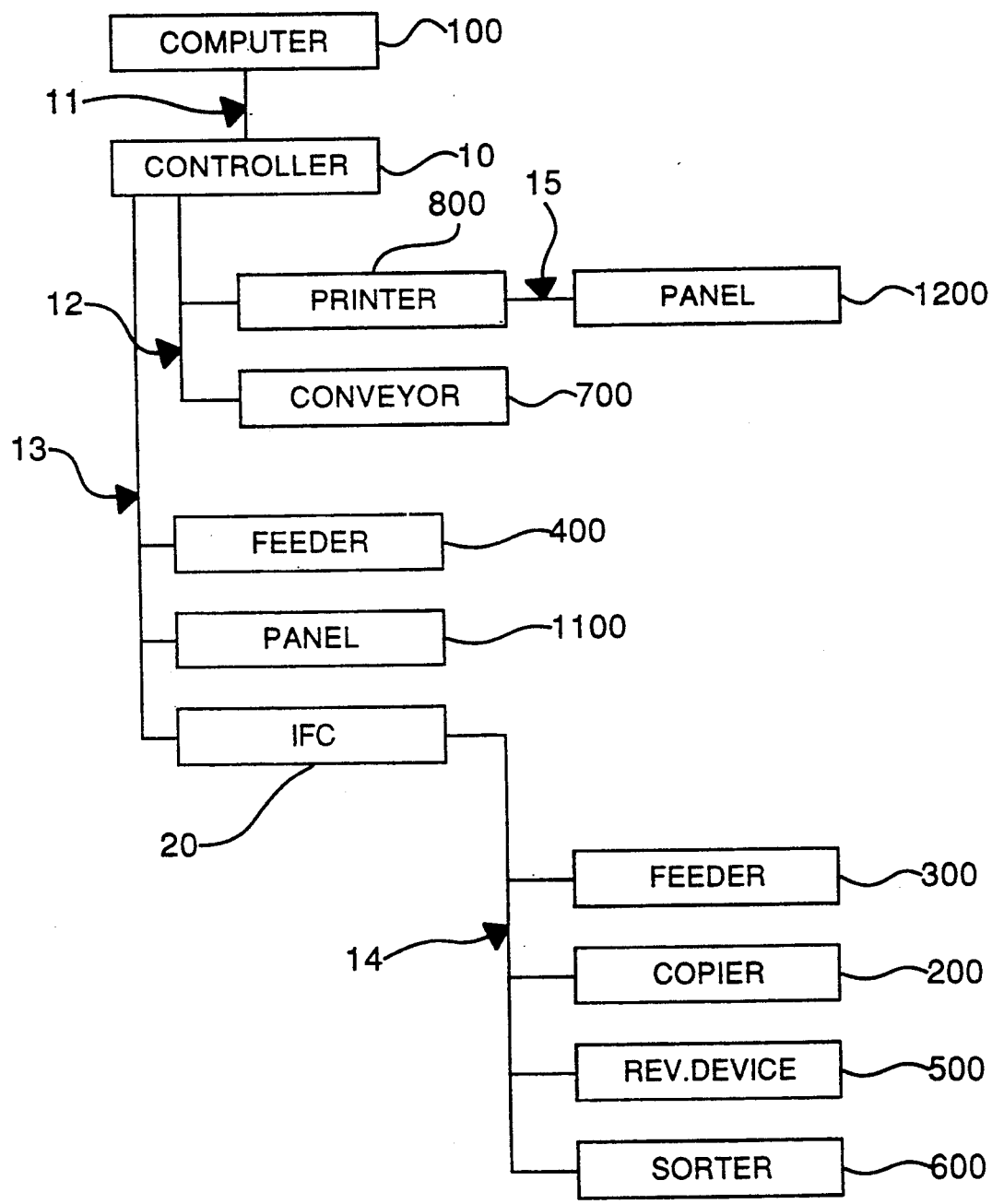
FIG. 8 is a block diagram indicative of the system organization of the composite apparatus.

FIG. 8 schematically depicts the system organization of the composite apparatus. The host computer 100 not only prepares print data of images to be printed by the laser printer 800 but outputs control signals required for the laser printer 800, the copier 200 or the like. A C/G controller 10 is connected to the host computer 100 via a host interface 11 and outputs appropriate control signals to another device such as, for example, the laser printer 800 based on signals inputted thereinto from the host computer 100. Also, the C/G controller 10 receives signals indicative of the state of the laser printer 800 or the like. The operation panel 1200 is connected to and controlled by the laser printer 800 via a communication line 15 corresponding to an ordinary input-output bus. The sheet conveying device 700 and the laser printer 800 are connected to the C/G controller 10 via a video interface 12. An interface controller (IFC) 20, the automatic document feeder 400, and the operation panel 1100 of the copier 200 are connected to the C/G controller 10 via a communication line 13. The interface controller 20 is also connected to the copier 200, the sheet feeder 300, the sheet reversing device 500, and the sorter 600 via a communication line 14.

III. Print Mode

The composite apparatus having the above-described organization is operable in the following print modes.

A. Single Drive Mode

(i) Single Drive Copy Mode by Copier

In this mode, the copier 200 copies documents placed on the document platform 209 on papers fed from the sheet cassettes 211 and 212 of the copier 200 or from the sheet feeder unit 301 or the sheet cassettes 302–304 of the sheet feeder 300. This copy mode includes a one-side copy mode in which an image is copied on only one side of a paper, a double-side copy mode in which two images are respectively copied on both sides of a paper, and a composite copy mode in which two images are copied on one side of a paper, one over the other.

(ii) Single Drive Print Mode by Printer

In this mode, the laser printer 800 is independently driven in response to instructions from the host computer 100 to print letters or figures on papers fed from the sheet feed unit 820 of the laser printer 800.

The single drive copy mode by the copier 200 and the single drive print mode by the laser printer 800 can be performed simultaneously.

B. Double Drive Mode

(iii) This mode is a mode in which images are formed in response to instructions from the host computer 100 by driving the laser printer 800 or other devices such as, for example, the copier 200 and the sheet feeder 300. More specifically, in accordance with the instructions from the host computer 100, papers are fed from the sheet feeder 300 or documents prepared by the laser printer 800 are copied by the copier 200.

IV. Image Formation

(IV-i) Single Drive Copy Mode by Copier

In this copy mode, upon operation of switches (not shown) provided on the operation panel 1100 of the copier 200, one of the one-side, double-side, and composite copy modes, one of the sheet cassettes and the sheet feed unit, the color of development and the like are selected and the number of copies are inputted. A document to be copied is placed at an appropriate location on the document platform 209 by opening the automatic document feeder 400. When the copying operation is completed, the document is removed by opening the automatic document feeder 400.

When automatic document feed is required by the use of the automatic document feeder 400, a document or documents are initially placed on the document feed cassette 409 and the copy start switch 1101 is then depressed. In this case, the mode is automatically set to an automatic document feed mode, in which the document or documents are automatically conveyed to the copying position located on the document platform 209 by the operation of document feed rollers 414, the conveyor belt 406 and the like. When the copying is completed, each of the documents is removed from the copying position by the operation of the conveyor belt 406 and is introduced to the discharge tray 408 by the switching claw piece 415. If a plurality of documents are placed on the document feed cassette 409, they are successively conveyed to the copying position located on the document platform 209.

In the automatic document feed mode by the automatic document feeder 400, when the double-side copy mode is selected, a document of which an image of one side has been copied is introduced to the document reversing unit 407 by the switching claw piece 415. The document reversing unit 407 turns the document upside down, which is then conveyed again to the copying position on the document platform 209.

On the other hand, in the copier 200, upon depression of the copy start switch 1101, the photosensitive drum 201 rotates counterclockwise, as viewed in FIG. 2, so that the outer peripheral surface of the photosensitive drum 201 may be uniformly electrostatically charged by the corona charger 202. At this moment, the optical system 210 scans the document, and a reflected light is applied to an electrostatically charged area on the photosensitive drum 201 to form an electrostatic latent image. The electrostatic latent image is made visible as a toner image by the color developing device 203 or the black developing device 204 and is transferred on a paper at a location opposed to the transfer charger 205. The paper is selectively fed from the sheet feeder unit 301 or the sheet cassettes 302–304 of the sheet feeder 300 or the sheet cassettes 211 and 212 of the copier 200 and is conveyed to said location by the timing rollers 213 in synchronization with the toner image. In this copy mode, the switching claw piece 311 of the sheet feeder 300 is positioned so that the paper fed from the sheet feeder unit 301 or the sheet cassettes 302-304 may be introduced to the path 225 of the copier 200.

The paper to which the toner image has been transferred is separated from the photosensitive drum 201 by the separation charger 206 and is conveyed to the fixing device 216 by the conveyor belt 214. In the fixing device 216, the toner image is fixed to the paper, which is then conveyed to the sheet reversing device 500 via the path 224. After the toner image has been removed from the photosensitive drum 201, residual toner is also removed therefrom by the cleaning device 207 and residual electrostatic charge is erased by the eraser 208.

The paper discharged from the copier 200 travels along different paths according to the copy mode selected. More specifically, when the one-side copy mode is being selected, the paper conveyed to the sheet reversing device 500 is introduced to the path 508 leading to the sorter 600 by the switching claw piece 509. In the sorter 600, the paper is discharged on either the bin 606 or 609 by the switching claw pieces 604 and 607.

On the other hand, when the double-side copy mode is being selected, the paper conveyed to the sheet reversing device 500 is introduced to the sheet reversing path 504 by the switching claw piece 509 and is further conveyed downwards along this path 504. Thereafter, the paper is conveyed upwards along this path again and is discharged on the intermediate tray 217 of the copier 200 via the middle tray 502 by the operation of the switching claw piece 511. The paper accommodated in the intermediate tray 217 is then conveyed to the path 226 and to a location opposed to the transfer charger 205 by the timing rollers 213. At this location, a toner image is transferred to the reverse side of the paper. The paper is then conveyed to the sheet reversing device 500 and to the sorter 600 via the path 508 by the operation of the switching claw piece 506. Finally, the paper is discharged on either the bin 606 or 609 by the switching claw pieces 604 and 607.

When the composite copy mode is being selected, an image is initially copied on the front side of a paper. This paper is then conveyed to the sheet reversing device 500 and to the intermediate tray 217 of the copier 200 without being reversed by the operation of the two switching claw pieces 509 and 511. Thereafter, another image is formed on the front side of the paper again in an overlapping manner, and the paper is discharged on the sorter 600.

(IV-ii) Single Drive print Mode by Printer

In this mode, image data are outputted from the host computer 100 to the controller 10, which pictures the image data into a bit-map and outputs this image information to the laser printer 800.

In the laser printer 800, the laser optical system 807 works in response to the image information, thereby forming an electrostatic latent image on the outer peripheral surface of the photosensitive drum 801 rotating while being electrostatically charged by the corona charger 802. The electrostatic latent image is made visible as a toner image by the developing device 803. A paper is fed from the sheet feed unit 820 of the laser printer 800 via the path 812 and is conveyed to a location opposed to the transfer charger 804 in synchronization with the toner image by the operation of the timing rollers 808. The toner image is then transferred on the paper by the discharge of the transfer charger 804. Thereafter, the paper, on which the toner image has been transferred, passes the fixing device 809 and is discharged on the tray 811 by the discharge rollers 810. On the other hand, the photosensitive drum 801, from which the toner image has been removed, is cleaned by the cleaning device 805 and the eraser 806.

(IV-iii) Double Drive Mode

The Double drive mode is largely classified into a first double drive mode in which the paper feed to the laser printer 800 is performed by the sheet feeder 300 and a second double drive mode in which a document prepared by the laser printer 800 is copied by the copier 200. These two modes are simultaneously operable.

(IV-iii-1) First Double Drive Mode

Because the laser printer 800 has only one sheet feed unit 820 designed solely to accommodate a stack of papers of one specific size, when papers of another specific size are designated by the host computer 100, the designated papers are fed from the sheet feeder 300.

More specifically, when papers of the size designated by the host computer 100 are not accommodated in the sheet feed unit 820 of the laser printer 800 but accommodated in the sheet feeder 300, the sheet feeder 300 feeds papers of an appropriate size from one of the sheet feeder unit 301 and the sheet cassettes 302-304 based on instructions from the host computer 100. The papers fed from the sheet feeder 300 are introduced to the path 310 by the switching claw piece 308 and to the sheet reversing device 500. The papers are then introduced to the vertical path 505 via the path 503 and to the path 601 of the sorter 600 by the switching claw piece 509. Finally, the switching claw pieces 604 and 607 introduce these papers to the laser printer 800 via the sheet conveying device 700.

(IV-iii-2) Second Double Drive Mode

(a) One-Side Copy Mode

In this mode, an image of a document is prepared by the laser printer 800 based on the image information from the host computer 100. At this moment, a paper required for preparation of the document is fed from the sheet feed unit 820 of the laser printer 800 or the sheet feeder unit 301 or the sheet cassettes 302-304 of the sheet feeder 300.

The laser printer 800 forms the image on the paper and discharges the paper i.e., the document to the document conveying device 900, which conveys the document along the path 911. In the document conveying device 900, the document is detected by document detector sensors 912 and 913 mounted therein and is led from the path 931 to the path 410 of the automatic document feeder 400 by the operation of the switching claw piece 933. When a plurality of documents are successively prepared by the laser printer 800, each of the documents led to the document conveying device 900 is temporarily placed in the stand-by condition on the path 911 and is then directed to the automatic document feeder 400 in synchronization with the operation of the copier 200 and the automatic document feeder 400.

The document fed to the path 410 of the automatic document feeder 400 is conveyed to the copying position on the document platform 209 by the rotation of the conveyor belt 406. At this moment, the photosensitive drum 201, the optical system 210, the developing devices 203 and 204 and the like are activated in the copier 200 so that the document set at the copying position may be copied on a required number of papers fed from the sheet cassettes 211 and 212, the sheet feeder unit 301 or the sheet cassettes 302-304. The papers, on which the image of the document has been copied, pass the fixing device 216 and are conveyed to the sorter 600 via the paths 224 and 501. These papers are finally appropriately sorted on the bins 606 and 609 and other bins.

In the automatic document feeder 400, when the optical system 210 completes exposure to the document, the conveyor belt 406 rotates to discharge the document on the tray 408.

When a plurality of documents are prepared by the laser printer 800 and are sorted on the sorter 600, upon completion of the exposure thereof, the conveyor belt 406 rotates in the reverse direction so that the documents may be temporarily discharged on the document feed cassette 409. Upon completion of all the copying operations with respect to the documents prepared by the laser printer 800, the documents stacked on the document feed cassette 409 are fed by the rotation of the document feed rollers 414 and are introduced to the path 411 by the switching claw piece 413. The documents having passed the path 411 are conveyed to the path 932 of the document conveying device 900 and are introduced to the vertical path 921 by the switching claw piece 933. The documents then travel downwards along the vertical path 921 and are introduced to the path 507 of the sheet reversing device 500 and to the path 601 of the sorter 600 via the path 508 by the operation of the switching claw piece 509. In the sorter 600, each of the documents is sorted on an appropriate bin, which accommodates the copied papers having an image corresponding thereto. In other words, each of the documents prepared by the laser printer 800 is also regarded as a sheet of copied paper. If only a sheet of document is prepared by the laser printer 800, the document may be temporarily discharged on the document feed cassette 409 and then be conveyed to the sorter 600, as stated previously, or otherwise may be directly conveyed to the sorter 600 without discharging the document on the document feed cassette 409.

(b) Double-Side Copy Mode

When this mode is being selected, a document for the front side is initially prepared by the laser printer 800 and is placed at the copying position on the document platform 209. The copier 200 copies an image of this document on one side (front side) of a paper. This paper is introduced to and travels downwards along the sheet reversing path 504 of the sheet reversing device 500. Thereafter, the direction of travel of the paper is reversed so that the paper may travel upwards along the sheet reversing path 504 and be conveyed to the intermediate tray 217 via the paths 502 and 227.

Subsequently, a document for the reverse side is prepared by the laser printer 800 and is placed at the copying position on the document platform 209. The copier 200 feeds the paper accommodated in the intermediate tray 217 so that an image of the document for the reverse side may be copied on the reverse side of the paper. In this way, two images are formed on the front side and the reverse side of a paper.

This paper is conveyed to the sorter 600 via the sheet reversing device 500 and is discharged on an appropriate bin. The document placed on the document platform 209 is discharged on the discharge tray 408 upon completion of the copying operation.

Let the case be considered in which two images are formed on the front and reverse sides of a sheet of paper, respectively, by the laser printer 800 and this paper is directed to the copier 200 for double-side copying thereof. In this case, an image is initially formed on the front side of the paper by the laser printer 800 and this paper is discharged as a document on the document conveying device 900. The document is then introduced from the horizontal path 911 of the horizontal unit 910 to the vertical path 921 of the vertical unit 920 by the switching claw piece 933. The document is further introduced to the path 507 and the sheet reversing path 504 of the sheet reversing device 500, in which the direction of travel of the document is reversed so that the document may be introduced to the sorter 600 via the path 508 by the operation of the switching claw piece 509. Thereafter, the document is introduced to the sheet conveying device 700 via the paths 601 and 602 and is conveyed via the path 701 to the laser printer 800 again, in which another image is formed on the reverse side of the document. The document having the two images on both sides thereof is conveyed to the automatic document feeder 400 via the document conveying device 900. In the automatic document feeder 400, the document is placed at the copying position with its reverse side downwards. Upon completion of image exposure, the document is conveyed to the document reversing unit 407, in which the document is turned upside down. This document is placed again at the copying position with its front side downwards. Upon completion of image exposure to both sides of the document, the document is temporarily discharged on the document feed cassette 409 and is then sorted by the sorter 600. On the other hand, in the copier 200, the two images of the document are copied on both sides of a paper in accordance with the ordinary double-side copy mode, and the paper is then discharged to the sorter 600.

(c) Composite Copy Mode

Let the case be considered in which two sheets of documents prepared by the laser printer 800 are copied on one side of a sheet of paper, one over the other. In the copier 200, an image of the first document is initially copied on the front side of the paper, which is temporarily stored on the intermediate tray 217 without being turned upside down. Then, an image of the second document is copied over the previous image formed on the front side of the paper. In other words, the paper conveyed from the copier 200 to the sheet reversing device 500 is introduced directly to the path 502 from the path 501 and is not turned upside down on the sheet reversing path 504. Other operations are the same as those in the double-side copy mode.

In the above-described double-side or composite copy mode, a developing device used in the first copying operation can be switched to another developing device in the second copying operation. By dosing so, it is possible to make the color for development of the front side differ from that of the reverse side or to prepare a composite copy in two colors.

V. System Control

The control of the system shown in FIG. 8 will be discussed hereinafter.

Figure 9:
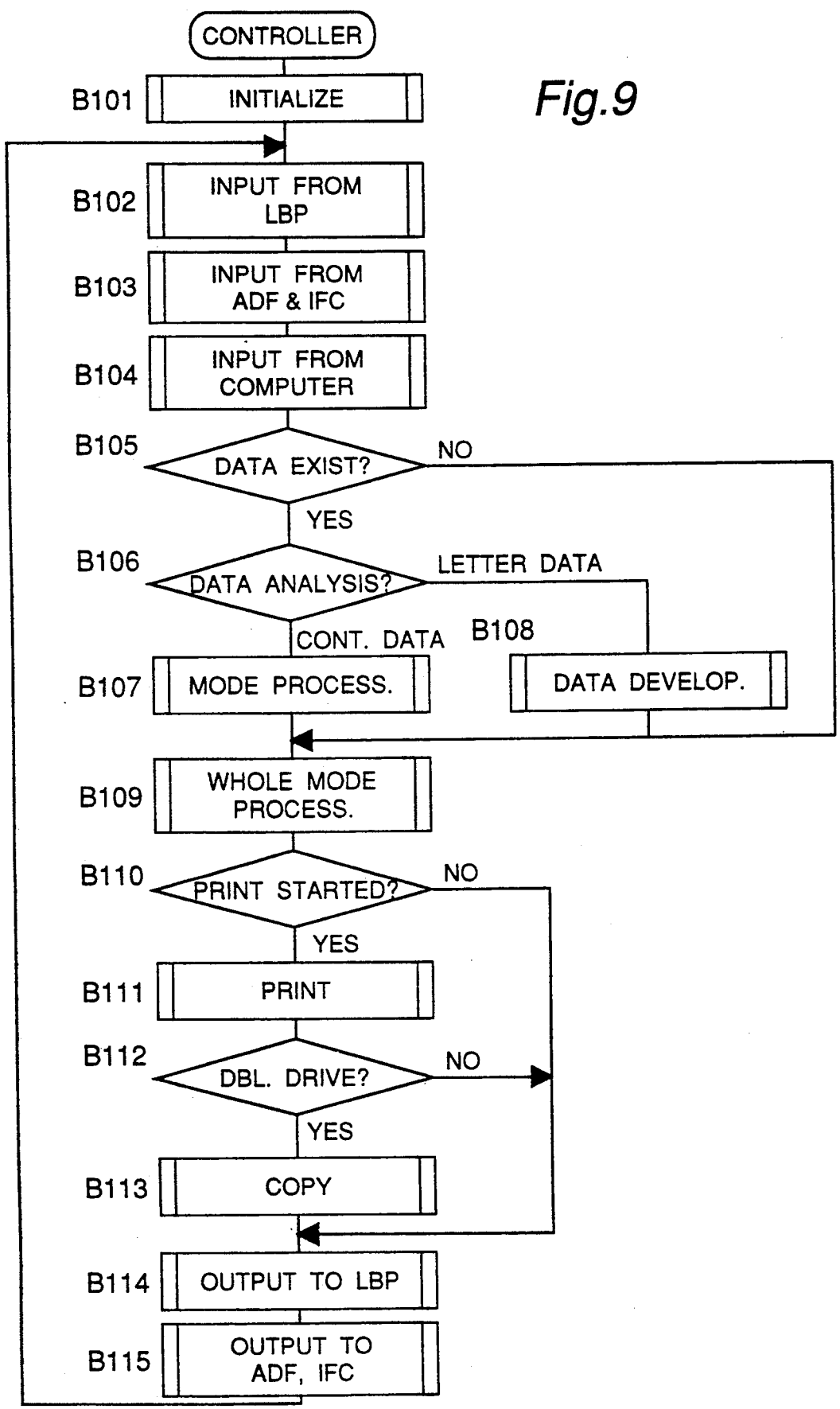
FIG. 9 is a flow-chart indicative of the control of a C/G controller.

(V-i-1) C/G Controller 10 (FIG. 9)

When the C/G controller 10 is turned on, the initialization is performed (step B101). As a result, condition data from the laser printer (LBP) 800 are inputted into the C/G controller 10 (step B102), and data from the automatic document feeder (ADF) 400, those from the interface controller (IFC) 20, and those from a control processor of the operation panel 1100 are inputted into the C/G controller 10 (step B103). Accordingly, the C/G controller 10 can recognize the conditions of the laser printer 800, those of the copier 200, and as to whether these machines 800 and 200 are coupled with the C/G controller 10.

Subsequently, data input from the host computer 100 is performed (step B104), and step B105 determines whether the data input from the host computer 100 exists. If the data input exists, step B106 performs data analysis. If the data are control data or data relating to the copy mode or the like, step B107 manipulates these data. If the data are letter data to be outputted from the laser printer 800, the procedure advances to step B108 at which data development is performed. Step B109 determines the details of the control of the entire composite apparatus.

Subsequently, step B110 determines whether a print start signal has been inputted into the laser printer 800. If the start signal has been inputted, the laser printer 800 performs a printing operation (step B111). Thereafter, step B112 determines whether the double drive mode is being selected. If the double drive mode is being selected, a copying operation corresponding thereto is performed (step B113) and data output to the laser printer 800, the automatic document feeder 400, and the interface controller 20 is performed (step B114, B115).

Upon completion of the above processing, the C/G controller 10 receives data from the laser printer 800 again (step B102). If there is a paper request signal indicative of a paper feed request from the sheet feeder 300 to the laser printer 800, the C/G controller 10 receives this signal and outputs it to the interface controller 20 (step B115).

Figure 10:
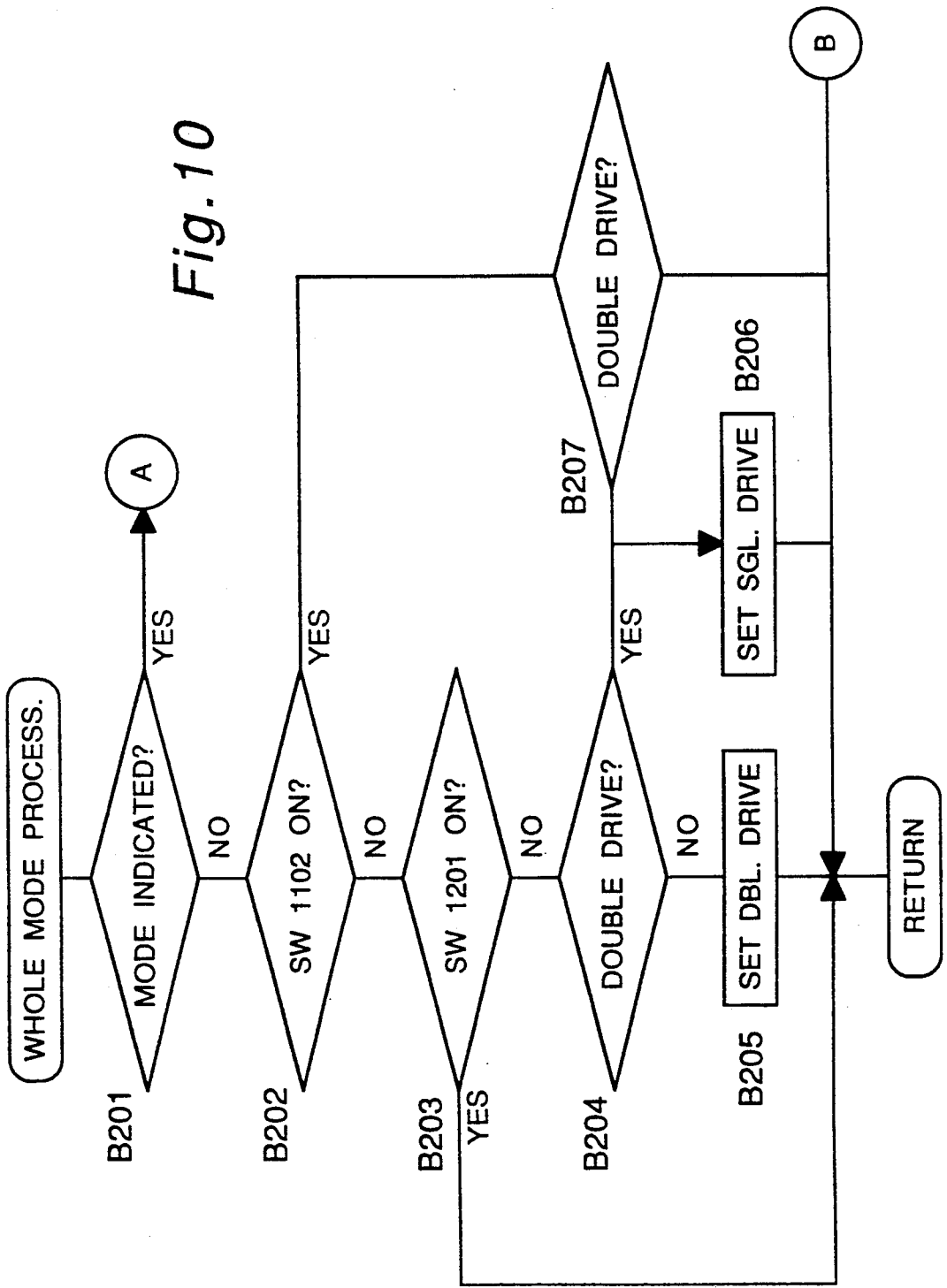
FIGS. 10 and 11 are flow-charts indicative of whole mode processing under the control of the C/G controller.
Figure 11:
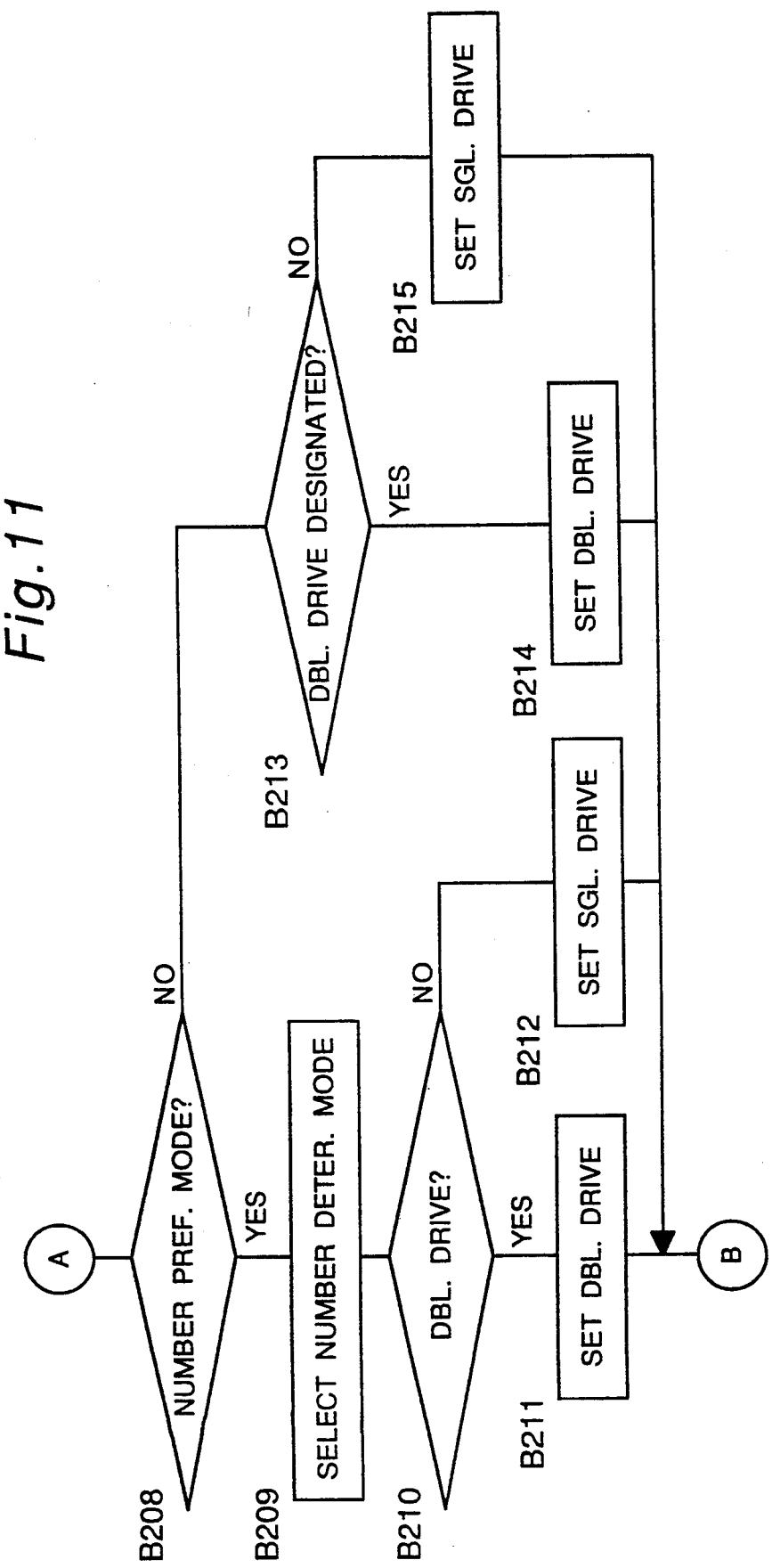

(V-i-2) Whole Mode Processing (FIGS. 10 and 11)

In the whole mode processing (B109) of the controller 10, step B201 determines whether there exists a mode indication from the host computer 100 i.e., whether there exists an indication of the double drive mode or the single drive mode.

If no mode indication is presented from the host computer 100, step B202 determines whether the mode selector switch 1102 of the operation panel 1100 of the copier 200 has been depressed. If this switch 1102 has not been depressed yet, step B203 determines whether the mode selector switch 1201 of the operation panel 1200 of the laser printer 800 has been depressed. In determining whether either the double drive mode or the single drive mode has been selected, a signal from the host computer 100, that from the mode selector switch 1102 of the operation panel 1100 of the copier 200, and that from the mode selector switch 1201 of the operation panel 1200 of the laser printer 800 have a first, a second, and a third priority, respectively.

If no mode indication is presented from the host computer 100 and the mode selector switch 1102 is depressed, step B207 determines whether the composite apparatus is set at the double drive mode. If the determination at step B207 is YES, the mode is switched from the double drive mode to the single drive mode (step B210). In contrast, if the composite apparatus is set at the single drive mode, this mode is maintained. If no mode indication is presented from the host computer 100 and the mode selector switch 1102 is not depressed with only the mode selector switch 1201 of the operation panel 1200 of the laser printer 800 depressed, step B204 determines whether the copier is set at the double drive mode. If the determination at step B204 is YES, the mode is switched from the double drive mode to the single drive mode (step B206). In contrast, if the determination at step B204 is NO, the mode is switched from the single drive mode to the double drive mode (step B205). The mode is determined in this way. Appropriate signals in compliance with the selected mode are outputted to the laser printer 800, the automatic document feeder 400, the interface controller 20, and the control processor of the operation panels 1100 and 1200.

On the other hand, if an indication of the double drive mode or the single drive mode is presented from the host computer 100, step B208 determines whether a number-of-sheet preference mode has been set. The number-of-sheet preference mode is a mode which determines whether all transcriptions are to be performed at the single drive mode or the double drive mode in consideration of the conditions of the number of sheets designated and the like and at which a mode switching operation is performed in accordance with this determination. The number-of-sheet preference mode may be incorporated into a control program of the composite apparatus or otherwise arbitrarily selected by the operation of a panel.

If the number-of-sheet preference mode is set, step B209 performs the processing for selection of a number-of-sheet determination mode, which will be discussed later. Thereafter, step B210 determines whether the double drive mode is being selected. If the double drive mode is being selected, the composite apparatus is set at the double drive mode (step B211). In contrast, if the single drive mode is being selected, the composite apparatus is set at this mode (step B212). If the number-of-sheet preference mode is not set, step B213 determines whether the mode designated by the host computer 100 is the double drive mode. In compliance with the mode designated, the composite apparatus is set at the double drive mode or the single drive mode (steps B214 and B215).

Figure 12:
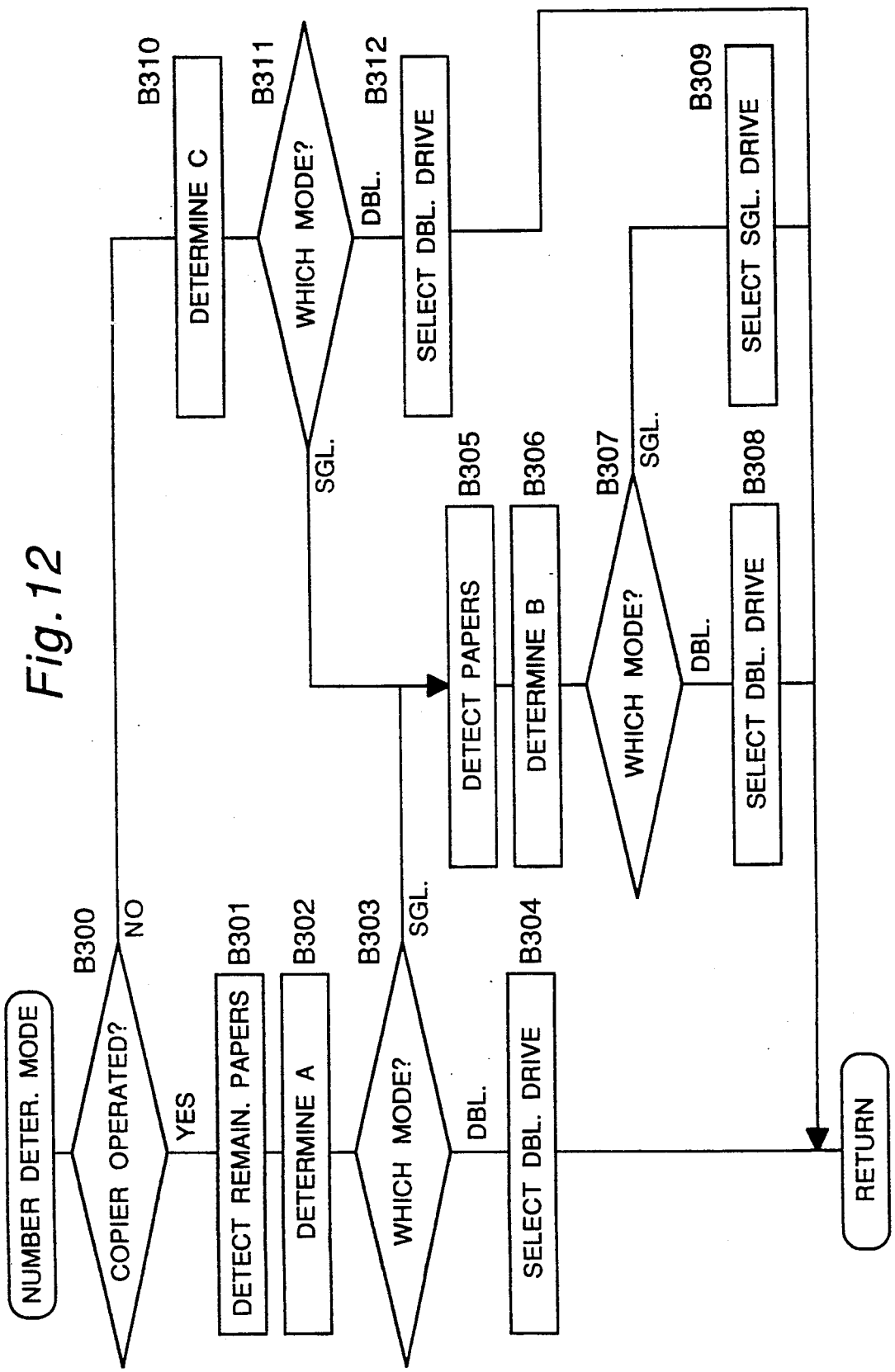
FIG. 12 is a flow-chart indicative of the control of selection of a number-of-sheet determination mode.

(V-i-3) Selection of Number-of-Sheet Determination Mode (FIG. 12)

In the selection of the number-of-sheet determination mode, step B300 initially determines whether the copier 200 is in operation. If the copier 200 is in operation, the copier 200 detects the number of the rest of papers to be copied (step B301) and performs a determination A (step B302). The number of the rest of papers to be copied can be obtained by subtracting the number of papers already copied from the number of copies designated.

The determination A is as follows.

$$N \cdot t(LBP) > n(PPC) \cdot t(PPC) + N(PPC) \cdot (PPC)$$

NOTE:
- N: the number of transcripts designated by the host computer 100
- N(PPC): the number of papers to be copied by the copier at the double drive mode ($=N-1$)
- n(PPC): the number of the rest of papers to be copied by the copier
- t(LBP): the time required for printing a sheet of paper by the use of the laser printer
- t(PPC): the time required for copying a sheet of paper by the use of the copier In this formula, the left-hand term indicates the time required for performing all transcriptions designated at the single drive print mode whereas the right-hand term indicates the total of the time required by the completion of copying operations being now performed by the copier and the time required in the case where all the transcriptions designated are performed at the double drive mode.

If the result of determination A is YES, i.e., if it is determined that transcriptions by the number of papers designated can be performed at the double drive mode within a shorter period of time than at the single drive mode, the double drive mode is selected as the processing mode. In contrast, if the result of determination A is NO, i.e., it is determined that the transcriptions by the number of papers designated require a longer period of time at the double drive mode than at the single drive print mode, the single drive print mode is selected.

Subsequently, step B303 determines whether the selected processing mode is the double drive mode or the single drive print mode. If the double drive mode is being selected, double drive mode selection processing is performed (step B304). On the other hand, if the single drive print mode is being selected, the number of papers accommodated in the sheet feed unit 820 of the laser printer 800 is detected by a number-of-sheet detector means provided in the sheet feed unit 820 (step B305), and a determination B is performed (step B306).

The determination B is as follows.

$$\{N(LBP) - N(m)\} > N$$

NOTE:

N(LBP): the number of papers accommodated in the laser printer

N(m): the number of papers to be left as spare papers (this number may be zero)

If the result of determination is YES, i.e., if it is determined that the sheet feed unit 820 accommodates more papers than the number of papers to be transcribed, the single drive mode is selected as the processing mode. In contrast, if the result of determination is NO, the double drive mode is selected as the processing mode. Step B307 determines whether the selected processing mode is the double drive mode or the single drive print mode. According to the result of this determination, steps B308 and B309 performs double drive mode selection processing and single drive mode selection processing, respectively.

If step B300 determines that the copier 200 is out of operation, step B310 performs a determination C.

The determination C is as follows.

$$N \cdot t(LBP) < N(PPC) \cdot t(PPC) + t(s) + t(LBP)$$

NOTE: t(s): the time required for conveying a document prepared by the laser printer to the copying position In this formula, the left-hand term indicates the time required for performing all the transcriptions at the single drive print mode whereas the right-hand term indicates the time required for performing all the transcriptions at the double drive mode.

If the result of determination C is YES, the single drive print mode is selected as the processing mode, and if NO, the double drive mode is selected.

By way of example, when t(LBP)=5(sec), t(PPC)=3(sec), and t(s)=4(sec), the left-hand term=N·t(LBP) =5N whereas the right-hand term=N(PPC)·t(PPC)+t(s)+t(LBP)=3(N−1)+4+-5=3N+6.

When N=1, the left-hand term=5 whereas the right-hand term=9, and therefore, the left-hand term<the right-hand term.

When N=2, the left-hand term=10 whereas the right-hand term=12, and therefore, the left-hand term<the right-hand term.

When N=3, the left-hand term=15 whereas the right-hand term=15, and therefore, the left-hand term=the right-hand term.

When N=4, the left-hand term=20 whereas the right-hand term=18, and therefore, the left-hand term>the right-hand term.

When N=5, the left-hand term=25 whereas the right-hand term=21, and therefore, the left-hand term>the right-hand term.

From the above, it can be readily understood that until N=4, the use of the double drive mode cannot make the time required for transcriptions shorter than the use of the single drive mode. Accordingly, in this embodiment, although the selection of the single drive mode or the double drive mode is determined by the use of formulas, the control can be performed by the use of specific numerals, for example, so that when N≦4, the single drive mode is used, and when N>4, the double drive mode is used.

It is to be noted that, in the determinations A and C, t(PPC), t(LBP), and t(s) are determined in view of the performance of the copier 200, that of the laser printer 800, the size of papers to be printed or copied, and the like.

Subsequently, step B311 determines which mode has been selected based on the determination C. If the selected mode is the double drive mode, the double drive mode selection processing is performed (step B312). In contrast, if the selected mode is the single drive mode, the number of papers accommodated in the sheet feed unit 820 of the laser printer 800 is detected (step B305), and thereafter, the determination B and the like are performed (steps B306, B307, and B308)

Figure 13:
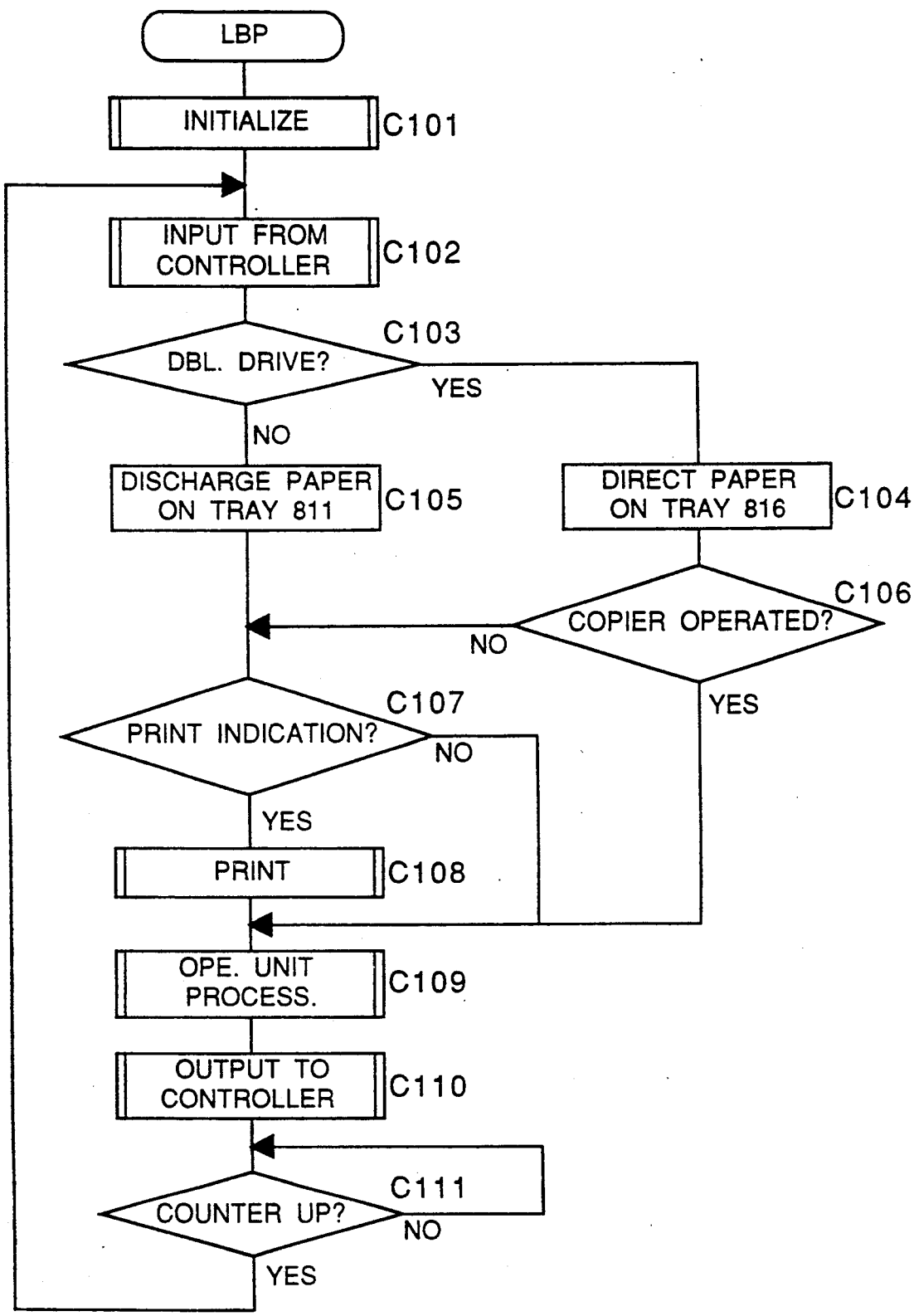
FIG. 13 is a flow-chart indicative of the control of the laser printer.

(V-ii-1) Laser Printer (FIG. 13)

Upon initialization (step C101), a control processor of the laser printer 800 receives data from the C/G controller 10 (step C102). The data inputted at this moment mainly include settings of the print mode and the like. Step C103 determines whether the double drive mode is being selected. If the double drive mode is being selected, the switching claw piece 817 is set so that a paper having passed the fixing device 809 may be directed to the path 816 leading to the document conveying device 900 disposed above it (step C104).

If step C103 determines that the double drive mode is not being selected, the switching claw piece 817 is set so that the paper having passed the fixing device 809 may be discharged on the discharge tray 811 (step C106). Thereafter, step C107 determines the presence or absence of a print indication. A signal used in this determination is contained in the data inputted from the C/G controller 10 at step C102. If there exists the print indication, printing operations are performed by the laser printer 800 (step C108), and operation unit processing is then performed (step C109), which will be discussed later.

Subsequently, condition signals of the laser printer 800 and the like are outputted to the C/G controller 10 (step C110). Then, step C111 determines whether a one-loop counter is up. If the determination at step C111 is YES, the procedure returns to step C102 at which data input from the C/G controller 10 is allowed.

Figure 14:
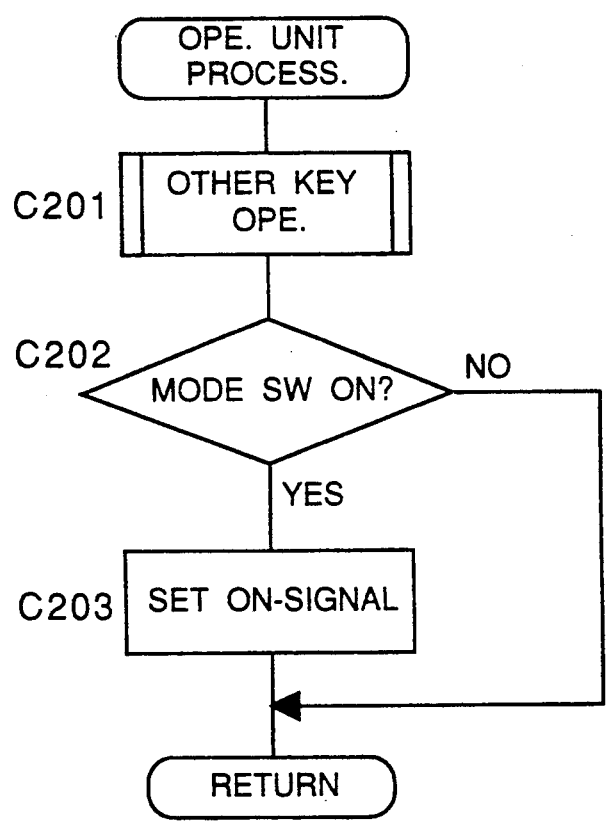
FIG. 14 is a flow-chart indicative of the control of operation unit processing under the control of the laser printer.

(V-ii-2) Operation Unit Processing (FIG. 14)

In the operation unit processing (step C109), other key processing are performed (step C201). Step C202 determines whether the mode selector switch 1201 has been depressed. If the mode selector switch 1201 has been depressed, a signal indicative of the depression of this switch is set (step C203). In contrast, if the mode selector switch 1201 has not been depressed, the procedure returns to the main routine. The signal indicative of the depression of the mode selector switch 1201 is outputted to the C/G controller 10 (step C110), which determines whether the selected mode is the double drive mode or the single drive mode.

Figure 15:
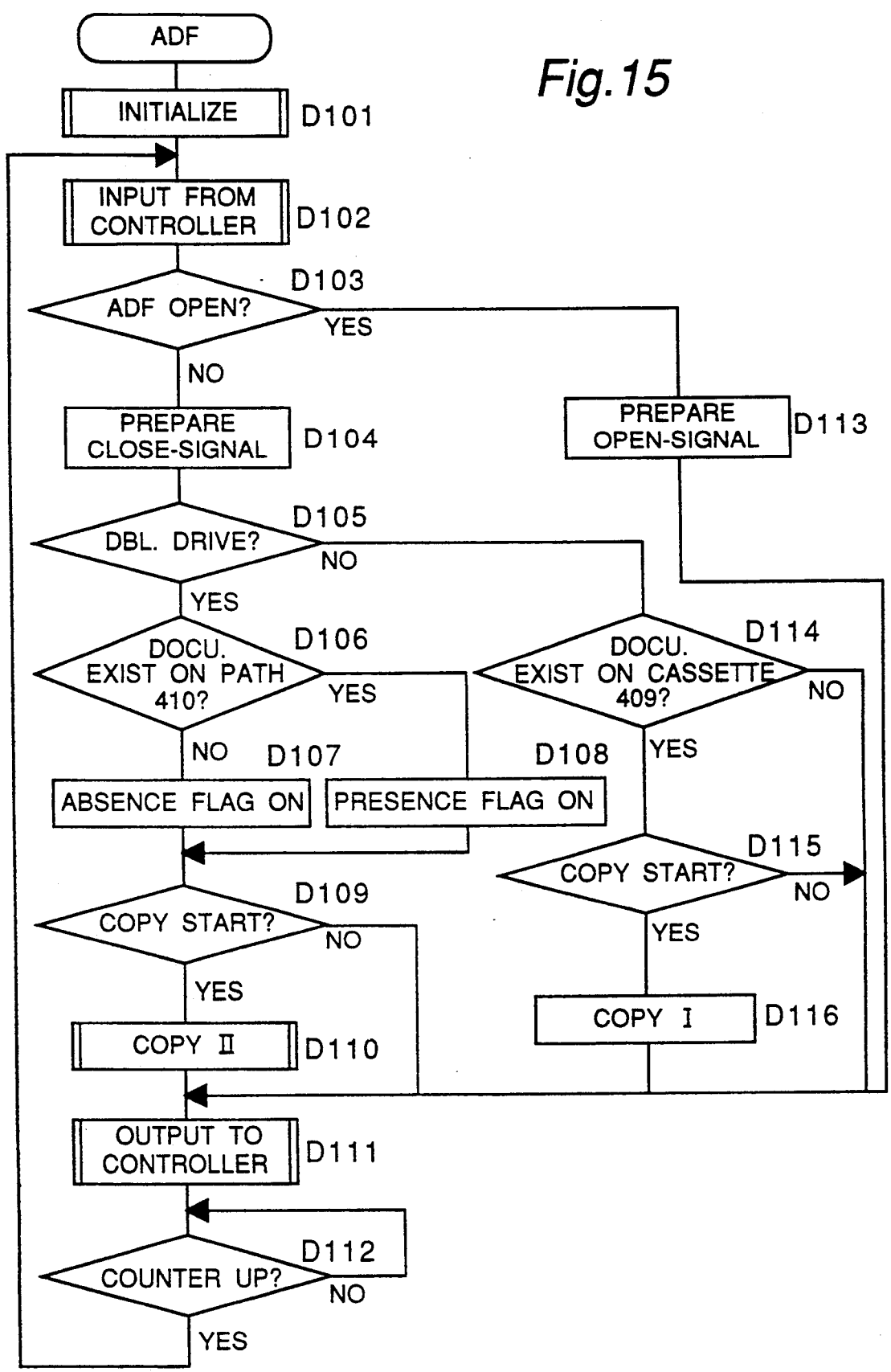
FIG. 15 is a flow-chart indicative of the control of the automatic document feeder.

(V-iii) Automatic Document Feeder (ADF) (FIG. 15)

Upon initialization (step D101), a control processor of the automatic document feeder 400 receives data from the C/G controller 10 (step D102). The data inputted at this moment include mode data such as, for example, the double drive mode and the single drive mode. Some are set by instructions from the host computer 100 and others by the operation panels.

Subsequently, step D103 determines whether the automatic document feeder 400 is open with respect to the copier 200. When the automatic document feeder 400 is open, a signal indicative of the opening thereof is prepared to interrupt processing of the automatic document feeder 400 irrespective of the selected mode (step D113) and is outputted to the C/G controller 10 (step D111). In contrast, when the automatic document feeder 400 is closed, a signal indicative of the closing thereof is prepared (step D104). Thereafter, step D105 determines whether the double drive mode is being selected.

If the double drive mode is not being selected i.e., if the single drive mode is being selected, step D114 determines whether a document is placed on the document feed cassette 409. This determination is performed based on a signal from a sheet detector sensor (not shown). If there exists no document, data indicative of the absence of any document are outputted to the C/G controller 10 (step D111). If there exists a document, step D115 determines the presence or absence of a copy start signal. If the copy start signal is inputted, a first copying processing is performed (step D116). In this first copying processing, the document is conveyed at a designated mode. Also, according to the mode such as, for example, the double-side copy mode and the composite copy mode, the document is turned upside down or the next document is conveyed.

If the double drive mode is being selected, step D106 determines based on a signal outputted from the document detector sensor 412 whether there exists a document on the path 410 of the automatic document feeder 400. If there exists a document, a sheet presence flag is set (step D108). If there exists no document, a sheet absence flag is set (step D107).

Subsequently, step D109 checks the presence or absence of a copy start signal. If there exists the copy start signal, a second copying processing is performed (step D110). In this second copying processing, the document is introduced to the document platform 209 in synchronization with a sheet conveying speed V2 of the laser printer 800. Then, data of the sheet presence flag, the sheet absence flag and the like are outputted to the C/G controller 10 (step D111), and after the one-loop counter is up, the procedure returns to step D102.

More specifically, when the double drive mode is being selected and documents are successively outputted from the laser printer 800, signals of the sheet presence flag and the sheet absence flag are set based on the signal of the document detector sensor 412 and are successively outputted to the C/G controller 10. Furthermore, documents introduced to the automatic document feeder 400 are successively conveyed to the document platform 209, and the succeeding documents outputted from the laser printer 800 are fed to the automatic document feeder 400 by the document conveying device 900.

Figure 16:
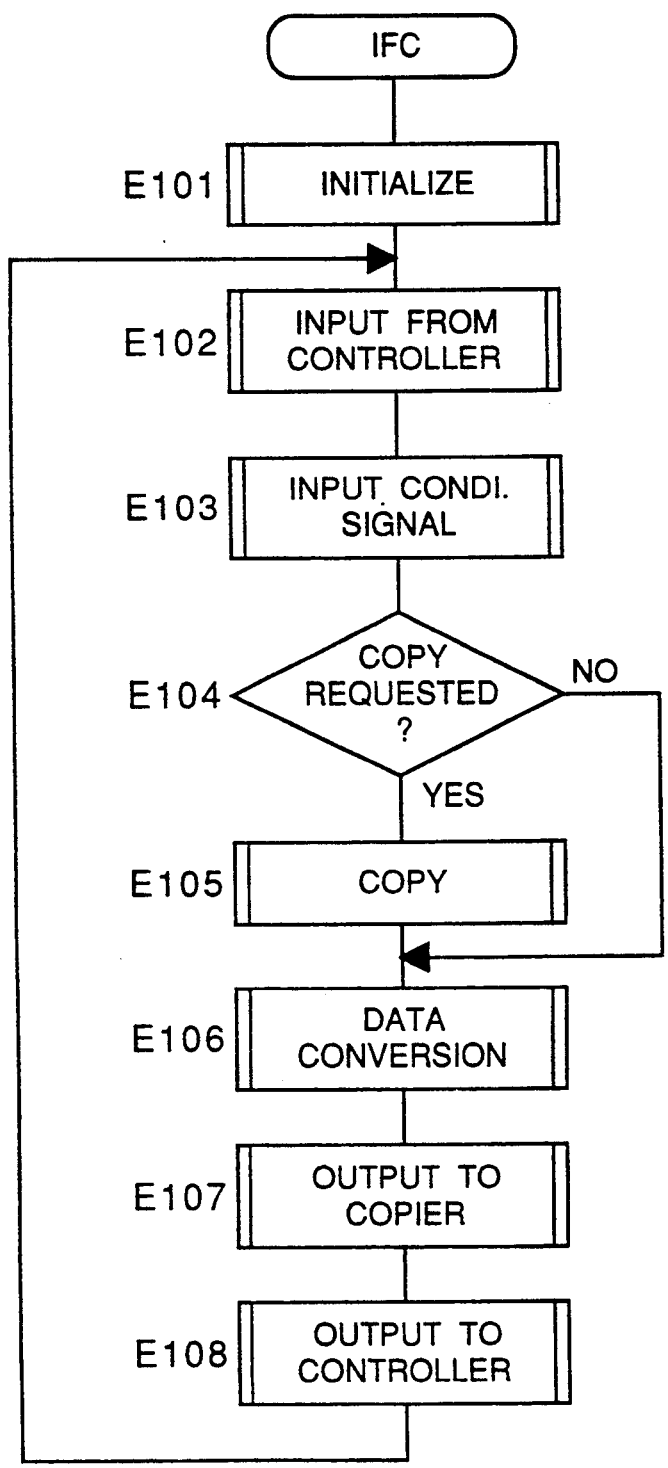
FIG. 16 is a flow-chart indicative of the control of an interface controller.

(V-iv) Interface Controller (IFC) (FIG. 16)

Upon initialization (step E101), a control processor of the interface controller (IFC) 20 receives necessary data, mainly the operation mode of the copier 200, from the C/G controller 10. Then, condition signals from the copier 200, the sheet feeder 300, the sheet reversing device 500, and the sorter 600 are inputted (step E103). These signals are signals indicative of the absence of papers, the opening of a front door and the like. Subsequently, step E104 determines the presence or absence of a copy request. If there exists the copy request, copying processing is performed (step E105) and data conversion processing is performed (step E106). In contrast, if there exists no copy request, the data conversion processing is performed (step E106) without performing the copying processing. Subsequently, some data are outputted to the copier and the like (step E107), and appropriate data are outputted to the laser printer 800 (step E108). More specifically, the interface controller 20 arranges information related to starting or timing of the devices, for example the copier 200, the sheet reversing device 500 and the like, and information related to sheet conveyance and successively returns them to the C/G controller 10.

Figure 17:
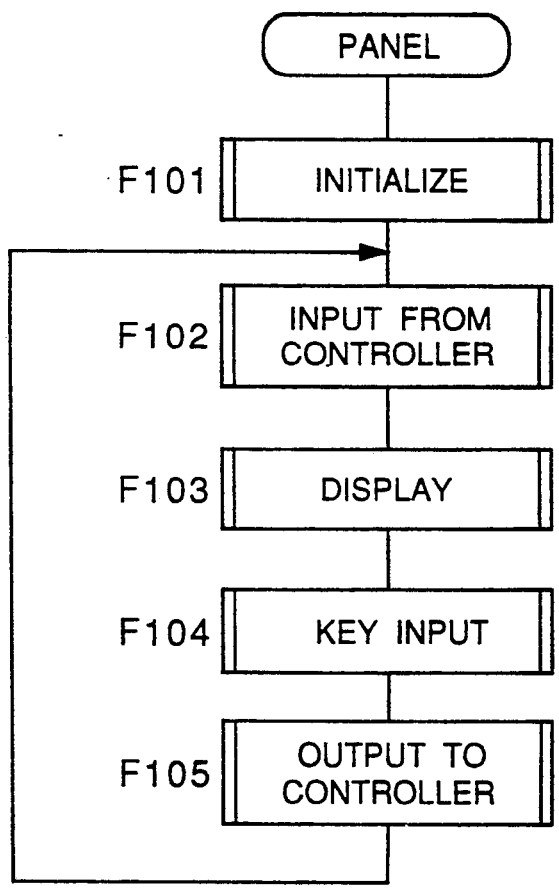
FIG. 17 is a flow-chart indicative of the control of the operation panel of the copier.

(V-v) Operation Panel of Copier (FIG. 17)

Upon initialization (step F101), a control processor of the operation panel 1100 of the copier 200 receives appropriate data from the C/G controller 10 (step F102) and displays the contents corresponding thereto on display portions of the operation panel 1100 (step F103). The contents displayed at this moment include the copy modes such as, for example, the one-side, double-side, and composite copy modes. Subsequently, input by key operations on the operation panel 1100 is received (step F104). For example, signals indicative of mode switching from the double-side copy mode to the composite copy mode and the like are such input. Then, the contents inputted are outputted to the C/G controller 10 (step F105).

Figure 18:
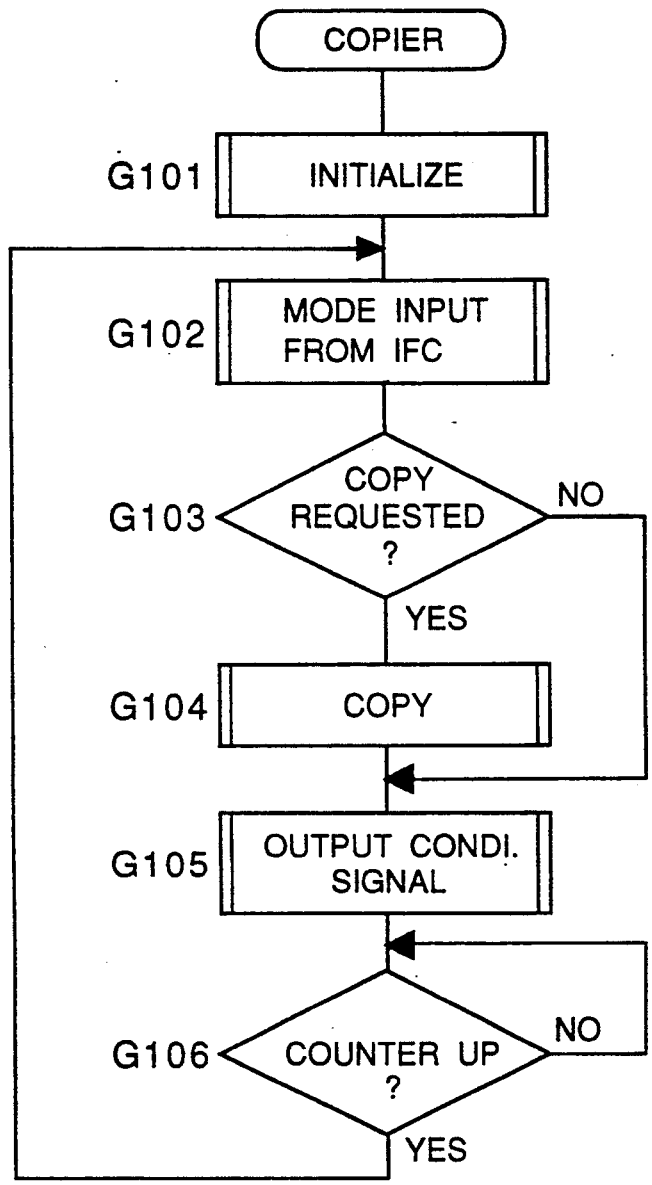
FIG. 18 is a flow-chart indicative of the control of the copier.

(V-vi) Copier (FIG. 18)

A control processor of the copier 200 operates based on mode instructions from the interface controller 20. Upon initialization (step G101), the copy mode is inputted from the interface controller 20 (step G102). Step G103 determines the presence or absence of a copy request at the copy mode inputted. If the copy request exists, copying processing is performed (step G104) and condition signals are outputted to the interface controller 20 (step G105). In contrast, if no copy request exists, the condition signals are outputted to the interface controller 20 (step G105) without performing the copying processing. Subsequently, step G106 determines whether the one-loop counter is up. If the determination at step G106 is YES, the procedure returns to step G102.

Figure 19:
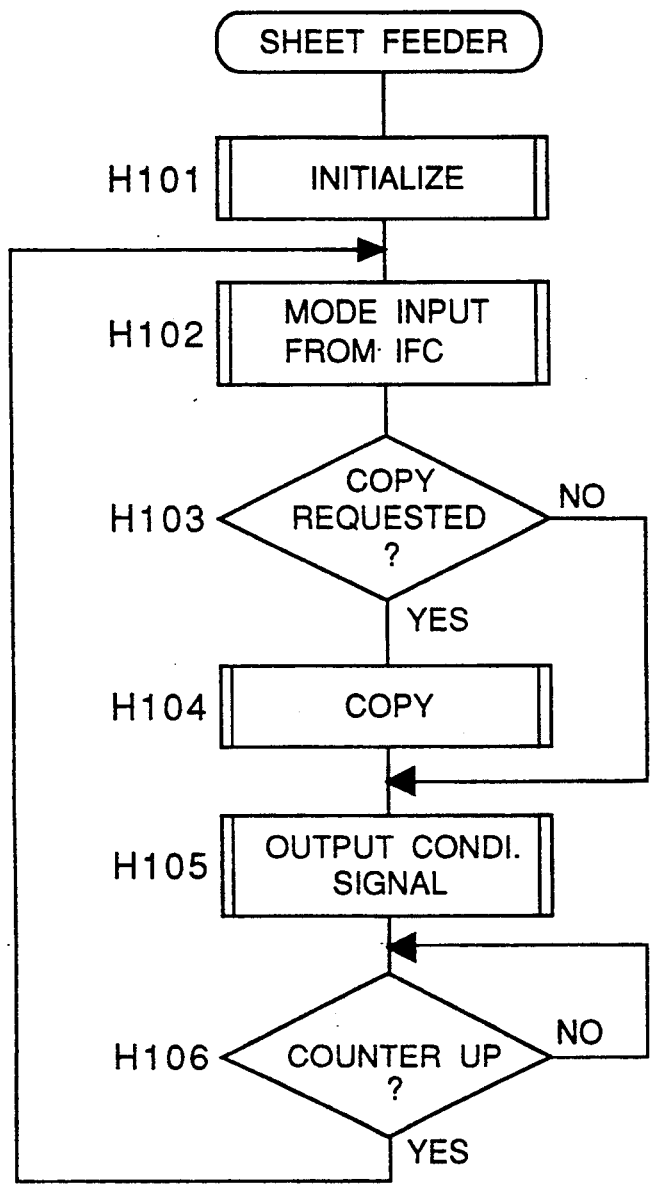
FIG. 19 is a flow-chart indicative of the control of the sheet feeder.

(V-vii) Sheet Feeder (FIG. 19)

A control processor of the sheet feeder 300 operates based on mode instructions from the interface controller 20. Upon initialization (step H101), the copy mode is inputted from the interface controller 20 (step H102). Step H103 determines the presence or absence of a copy request at the copy mode inputted. If the copy request exists, copying processing is performed (step H104) and condition signals are outputted to the interface controller 20 (step H105). If no copy request exists, the condition signals are outputted to the interface controller 20 (step H105) without performing the copying processing. Subsequently, step H106 determines whether the one-loop counter is up. If the one-loop counter is up, the procedure returns to step H102.

Figure 20:
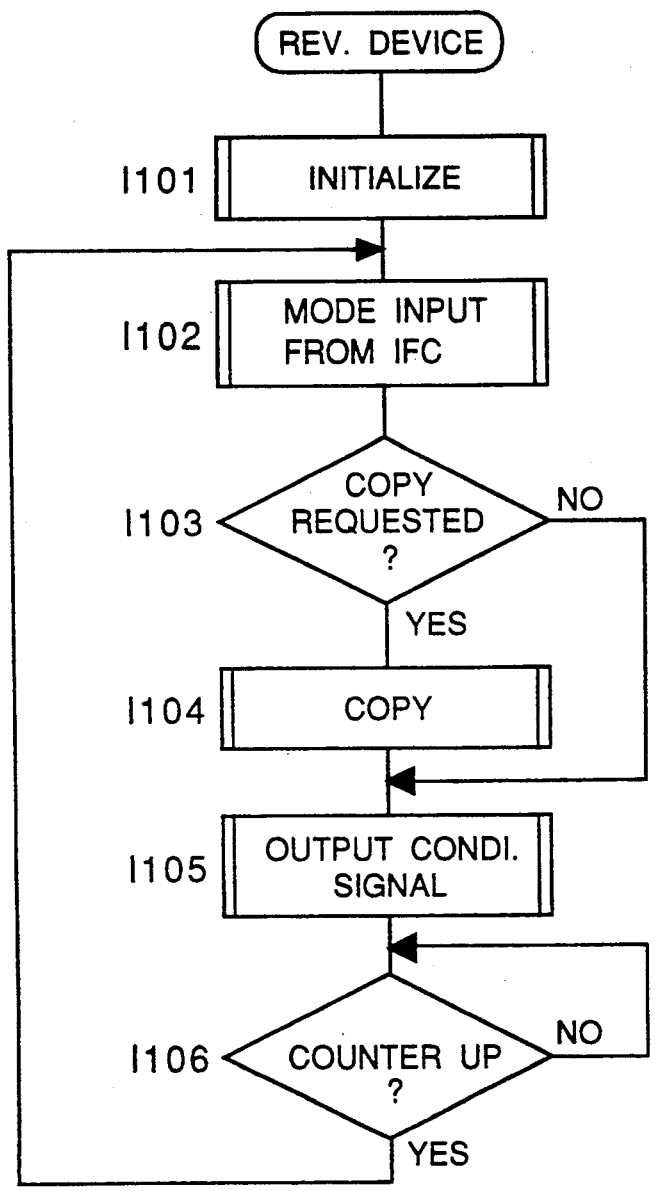
FIG. 20 is a flow-chart indicative of the control of the sheet reversing device.

(V-viii) Sheet Reversing Device (FIG. 20)

A control processor of the sheet reversing device 500 operates based on mode instructions from the interface controller 20. Upon initialization (step I101), the copy mode is inputted from the interface controller 20 (step I102). Step I103 determines the presence or absence of a copy request at the copy mode inputted. If the copy request exists, copying processing is performed (step I104) and condition signals are outputted to the interface controller 20 (step I105). In contrast, if no copy request exists, the condition signals are outputted to the interface controller 20 (step I105) without performing the copying processing. Subsequently, step I106 determines whether the one-loop counter is up. If the determination at step I106 is YES, the procedure returns to step I102.

Figure 21:
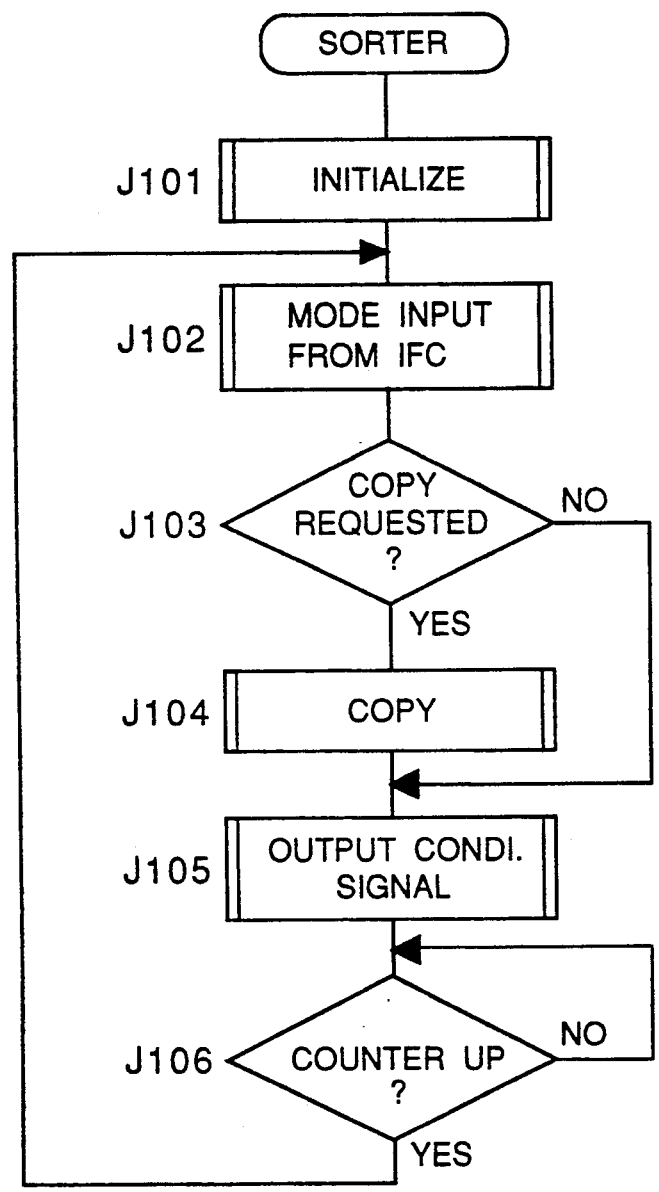
FIG. 21 is a flow-chart indicative of the control of the sorter.

(V-ix) Sorter (FIG. 21)

A control processor of the sorter 600 operates based on mode instructions from the interface controller 20. Upon initialization (step J101), the copy mode is inputted from the interface controller 20 (step J102). Then, step J103 determines the presence or absence of a copy request at the copy mode inputted. If the copy request exists, copying processing is performed (step J104) and condition signals are outputted to the interface controller 20 (step J105). In contrast, if no copy request exists, the condition signals are outputted to the interface controller 20 (step J105) without performing the copying processing. Subsequently, step J106 determines whether the one-loop counter is up. If the determination at step J106 is YES, the procedure returns to step J102.

(V-x) Recognition Modes of Devices and the Like

In the processing by the control processors of the devices constituting the composite apparatus, the same data are inputted from the interface controller 20 at steps G102, H102, I102, and J102. Each of the devices selectively recognizes only necessary data to determine the operation mode and outputs condition data peculiar thereto to the interface controller 20.

What are recognized and condition signals are as follows.

(a) Copier

Recognition Mode
 copy size
 developing devices to be used
 size of papers accommodated in sheet cassettes
 magnification: enlargement or reduction
Condition Signals
 presence or absence of developing devices
 presence or absence of papers
 errors associated with photosensitive drum or other devices disposed therearound
 opening or closing of door
 paper jamming
 paper discharge

(b) Sheet Feeder

Recognition Mode
 size of papers accommodated in sheet feeder unit and sheet cassettes
Condition Signals
 errors associated with driving system
 presence or absence of papers
 paper jamming

(c) Sheet Reversing Device

Recognition Mode
 copy mode
 paper size
Condition Signals
 errors associated with driving system
 opening or closing of door
 paper discharge from intermediate tray

(d) Sorter

Recognition Mode
 bins on which papers are discharged
 paper size
Condition Signals
 errors associated with driving system
 opening or closing of door
 paper jamming
 paper discharge As is clear from the above, the composite apparatus according to the present invention is provided with a single drive print mode, a double drive mode, and a selection mode. In the single drive print mode, a required number of transcripts are prepared by the printer based on image information outputted from the host computer. In the double drive mode, a document or documents are initially prepared by the printer based on image information outputted from the host computer. Then, the documents are conveyed on the document platform of the copier, in which a required number of transcripts are prepared. In the selection mode, when the number of transcripts designated by the host computer is less than a predetermined number, the transcripts are prepared at the single drive print mode. In contrast, when the number of transcripts designated by the host computer is not less than the predetermined number, the transcripts are prepared at the double drive mode.

Because of this, the period of time required for preparing a required number of transcripts can be minimized by determining said predetermined number in view of the printing performance of the printer and the copying performance of the copier.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An image forming apparatus comprising:
 a first image forming means for forming an image on a first sheet upon receipt of image information;
 a second image forming means having a document platform for forming on a second sheet an image of a document placed on said document platform;
 a document conveying means for conveying to said document platform said first sheet as a document on which the image has been formed by said first image forming means;
 a setting means for setting the number of transcripts to be prepared; and
 a transcription mode selector means for selecting either a single drive transcription mode or a double drive transcription mode to minimize a time required for preparing a required number of transcripts set by said setting means, said single drive transcription mode being a mode at which all the transcripts are prepared by sole use of said first image forming means, said double drive transcription mode being a mode at which said first sheet having the image formed by said first image forming means is conveyed by said document conveying means so that the rest of transcripts are prepared by said second image forming means.

2. The image forming apparatus according to claim 1, wherein said transcription mode selector means selects said single drive transcription mode when a relationship expressed by the following formula establishes and wherein said transcription mode selector means selects said double drive transcription mode when said relationship does not establish:

$$N \cdot t(1) < N(2) \cdot t(2) + t(s) + t(1),$$

N being the number of transcripts, t(1) being a time required for preparing one transcript by use of said first image forming means, N(2) being the number of transcripts to be prepared by said second image forming means at said double drive transcription mode and being equal to (N−1), t(2) being a time required for preparing one transcript by use of said second image forming means, t(s) being a time required for conveying the document prepared by said first image forming means to said document platform.

3. The image forming apparatus according to claim 2, wherein said t(1), t(2), and t(s) are determined in view of the size of sheets for transcription use.

4. The image forming apparatus according to claim 1, wherein said transcription mode selector means selects said single drive transcription mode when the number of transcripts set by said setting means is less than a given number and wherein said transcription mode selector means selects said double drive transcription mode when the number of transcripts set by said setting means is not less than said given number.

5. The image forming apparatus according to claim 1, wherein said first and second image forming means can operate independently.

6. The image forming apparatus according to claim 5, wherein when said second image forming means is in operation and when the number of transcripts and said image information are outputted to said first image forming means, said transcription mode selector means selects said single drive transcription mode when a relationship expressed by the following formula establishes and selects said double drive transcription mode when said relationship does not establish:

$$N \cdot t(1) < n(2) \cdot t(2) + N(2) \cdot t(2),$$

n(2) being the rest of transcripts to be prepared by said second image forming means.

7. The image forming apparatus according to claim 6, wherein said t(1), t(2), and t(s) are determined in view of the size of papers for transcription use.

8. The image forming apparatus according to claim 1 further comprising a transcription sheet conveying means for conveying transcription sheets accommodated in said second image forming means as transcription sheets for said first image forming means.

9. An image forming apparatus comprising:
   a first image forming means for forming an image on a first sheet upon receipt of image information;
   a second image forming means having a document platform for forming on a second sheet an image of a document placed on said document platform;
   a document conveying means for conveying to said document platform said first sheet as a document on which the image has been formed by said first image forming means;
   a setting means for setting the number of transcripts to be prepared;
   a determination means for determining whether said number of transcripts is greater than a given number; and
   a control means for controlling, when said determination means determines that said number of transcripts is greater than said given number, said first image forming means so as to prepare one transcript, said control means further controlling said document conveying means so as to convey said one transcript to said second image forming means, said control means also controlling said second image forming means so as to prepare the rest of transcripts.

* * * * *